(12) United States Patent
Yonezawa et al.

(10) Patent No.: US 6,382,023 B1
(45) Date of Patent: May 7, 2002

(54) THERMO-SENSITIVE TYPE FLOW RATE SENSOR

(75) Inventors: Fumiyoshi Yonezawa; Hiroyuki Uramachi; Tomoya Yamakawa, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/531,220

(22) Filed: Mar. 20, 2000

(30) Foreign Application Priority Data

Sep. 22, 1999 (JP) .......................... 11-269344

(51) Int. Cl.⁷ .................................. G01F 1/68
(52) U.S. Cl. .................................. 73/204.22
(58) Field of Search .............. 73/204.21, 204.22, 73/204.11, 204.19, 204.9, 204.6, 204.01

(56) References Cited

U.S. PATENT DOCUMENTS 4,130,018 A * 12/1978 Adams et al. ............ 73/290 V
4,348,900 A * 9/1982 Takahashi et al. ............. 73/505
5,186,044 A * 2/1993 Igarashi et al. ............. 73/118.2
5,631,416 A   5/1997 Rilling et al. .............. 73/204.22
5,789,673 A * 8/1998 Igarashi et al. ............. 73/202.5

FOREIGN PATENT DOCUMENTS

| JP | 8-271308 | 10/1996 | ............. G01F/1/68 |
| JP | 9-26343 | 1/1997 | ............. G01F/1/68 |
| JP | 10-293052 | 11/1998 | ............. G01F/1/68 |

* cited by examiner

*Primary Examiner*—Max Noori
(74) *Attorney, Agent, or Firm*—Sughrue Mion, PLLC

(57) ABSTRACT

To effect stable connection of an electrode of a sensing element to a connecting terminal, a holder for disposing the sensing element in a predetermined flow passage is provided. The holder is further provided with a rectification structure portion for rectifying the flow of an intake fluid and a connecting terminal securing portion with the connecting terminal embedded therein for fetching a signal of the sensing element, wherein the rectification structure portion and the connecting terminal securing portion are integrally formed by insulating material.

16 Claims, 19 Drawing Sheets

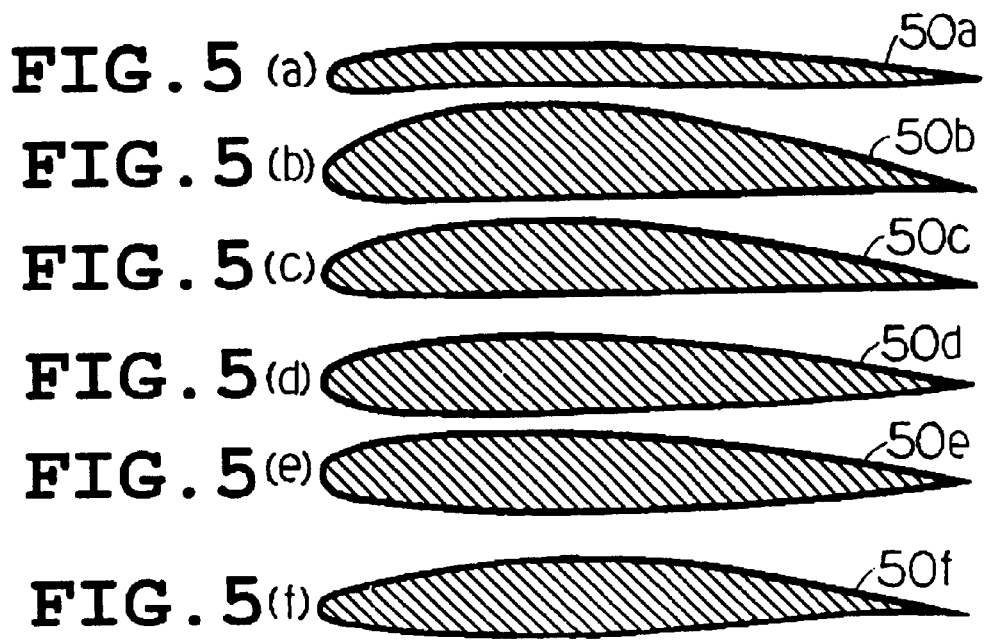
FIG. 5 (a)
FIG. 5 (b)
FIG. 5 (c)
FIG. 5 (d)
FIG. 5 (e)
FIG. 5 (f)
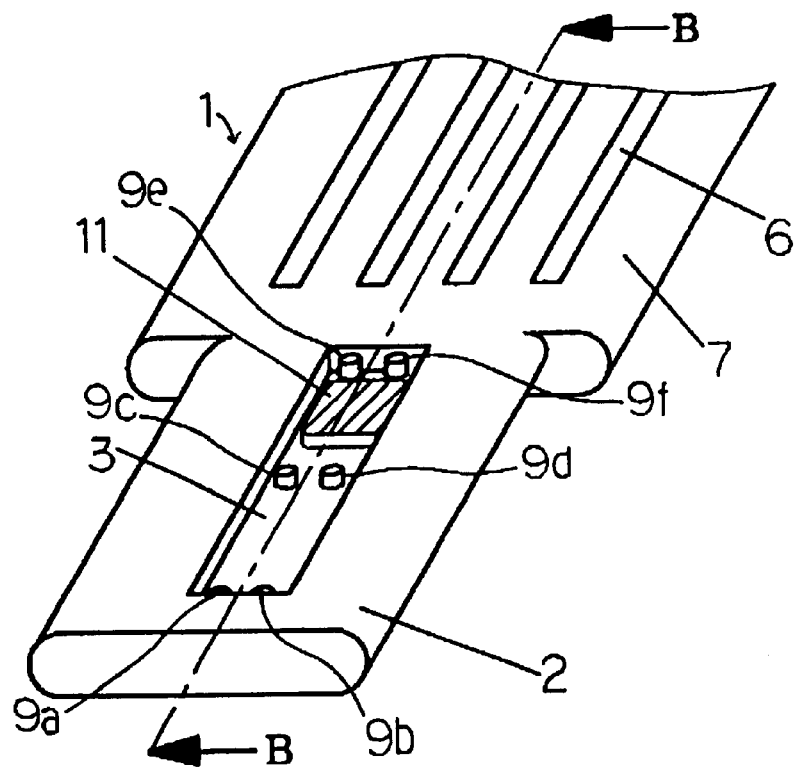
FIG. 6

CROSS SECTION TAKEN ALONG LINE B-B

CROSS SECTION TAKEN ALONG LINE C-C

CROSS SECTION TAKEN ALONG LINE D-D

CROSS SECTION TAKEN ALONG LINE A-A

VIEW AS SEEN FROM THE ARROW DIRECTION F

CROSS SECTION TAKEN ALONG LINE G-G

CROSS SECTION TAKEN ALONG LINE H-H

CROSS SECTION TAKEN ALONG LINE J-J

THERMO-SENSITIVE TYPE FLOW RATE SENSOR

BACKGROUND OF THE INVENTION

1. [Field of the invention]

The present invention relates to a flow rate sensor for detecting the flow rate or flow velocity of a fluid and more particularly to a thermo-sensitive type flow rate sensor for favorably detecting an air flow rate flowing into an internal combustion engine used for example in automobiles and the like.

2. [Description of the Prior Art]

As shown in Japanese laid-Open Patent Application (Kokai) No. Hei 10-142020 and U.S. Pat. No. 5,631,416, a thermo-sensitive type flow rate sensor having a sensing element is disclosed. Namely, the thermo-sensitive type flow rate sensor is known in which an exothermic resistor and an thermometric resistor consisting of a platinum thin film serving as the sensing element are evaporated on a silicon substrate by means of a micro-machining technique or they are deposited on the substrate by a sputtering method and the like.

FIGS. 34 and 35 show the structure of the thermo-sensitive type flow rate sensor that is introduced in U.S. Pat. No. 5,631,416.

In FIG. 34, reference numeral 101 is a holder consisting of a measuring pipe conduit 102, a housing portion 103 and a connector-connecting portion 104 that are integrally formed by a resin. This holder 101 is formed in a rectangular shape elongated longitudinally in a direction of a plug axis 105 and inserted from an opening portion 20k of a main conduit 20, the substantially central part of which is provided with the measuring pipe conduit 102. The housing portion 103 is formed a recess 106 on which a casing 107 is mounted.

As shown in FIG. 35, this casing 107 is formed by a plate-shaped support 108 for holding a sensing element 4, and a plate-like base portion 110 having a U-shape in section which are integrally formed by thin plate-like metal material. The sensing element 4 is housed in a housing portion 109 formed on the support 108 and secured by an adhesive agent applied on a bottom face of the housing portion 109.

Also, a control circuit substrate 22 made of ceramic base material is secured to the base portion 110 by an adhesive agent.

As shown in FIG. 34, electric connection of the sensing element 4 with the control circuit substrate 22 is effected by wire-bonding an electrode 5 on the sensing element 4 and a lead portion 111 formed on the control circuit substrate 22 together by a wire 8 such as tens to hundreds $\mu$m of aluminum.

Thus, an output signal from the sensing element 4 in response to the air flow rate or air flow velocity flowing into the main conduit 20 can be led to the connector-connecting portion 104 through the control circuit substrate 22.

The electrode 5 of the sensing element 4 is connected with the lead portion 111 of the control circuit substrate 22 by wire bonding. It is generally done by first recognizing a predetermined position of the electrode 5 and the lead portion 111 by means of image recognition processing equipment before bonding them by an automatic bonder (automatic bonding machine). Both the electrode 5 of the sensing element 4 and the lead portion 111 on the control circuit substrate 22 are minute or microscopic. Therefore, workability and reliability of the wire bonding highly depend on how precisely their relative position is secured.

However, in such a structure as stated above, the sensing element 4 is disposed in the housing portion 109 of the support 108 by the adhesive agent and the control circuit substrate 22 is disposed on the base portion 110 by the adhesive agent. Thus, there are included two factors of variation to be generated when the sensing element 4 and the control circuit substrate 22 are assembled. Further, even if there is caused variation in each of application quantity of the adhesive agent, there is some possibility that the relative position of the electrode 5 and the lead portion 111 does not agree.

Therefore, in the electrode 5 or the lead portion 111, when the bonding position deviates from a predetermined range or deviates too much therefrom, it is necessary to correct the bonding position where the image recognition is completed, for resetting. Therefore, 44 lowering of the reliability of the bonding portion and deterioration of the yield percentage are easily caused and working efficiency is also lowered.

Further, the sensing element 4 is secured in the housing portion 109 of the support 108 by the adhesive agent, but it is the so-called cantilevered. Therefore, the sensing element 4 may be disposed in a recess or convex manner relative to the surface of the support 108 depending on the application condition of the adhesive agent. In this case, there is caused individual difference in a flowing manner of an intake air and it is easy to cause variation of detection accuracy.

SUMMARY OF THE INVENTION

It is therefore an object of the present invention to solve the above-mentioned problems and to provide stable bonding so as to improve the reliability of a bonding portion.

According to this invention, there is provided a holder for disposing a plate-like sensing element in a predetermined flow passage. The holder is provided with a housing portion for disposing the sensing element in a predetermined position. It has a rectification structure portion for rectifying the flow of an intake fluid and a connecting terminal securing portion embedding a connecting terminal for fetching a signal of the sensing element therein, wherein the rectification structure portion and the connecting terminal securing portion are integrally formed by insulating material.

Preferably, the connecting terminal is embedded in the connecting terminal securing portion so that the surface thereof is exposed.

In one preferred manner of this invention, the rectification structure portion is formed to have a round fin-plate shape or wing shape at least on the upstream side.

In a further preferred manner of this invention, there is provided, on the bottom surface of the housing portion, a positioning portion for controlling the height of disposition of the sensing element in its thickness direction of the sensing element so that the upper surface of the sensing element has the same height as the surface of the holder.

Preferably, positioning portions are provided in at least 3 places.

In a still further preferred manner of this invention, there is provided a metal member on the bottom surface of the housing portion and an adhesive agent is applied on the metal member to fixedly bond the sensing element thereon.

Advantageously, the metal member is formed to have a lead frame shape together with the connecting terminal of the same material as the metal member, and it is then integrally formed with the rectification structure portion and the connecting terminal securing portion so as to form the holder by removing an unwanted part therefrom.

Preferably, the connecting terminal has one end electrically connected to an electrode of the sensing element and the top of that one end is bent in the direction of the bottom surface of the holder to be embedded therein.

In a preferred manner of construction, the connecting terminal has one end electrically connected to the electrode of the sensing element, wherein the top of that one end is projectingly disposed to be gradually longer from the central portion to peripheral portion to surround the electrode of the sensing element.

Preferably, the electrode of the sensing element is disposed in an arch shape to allow the central part thereof to project longer than the peripheral part relative to one end of the connecting terminal that is electrically connected to the electrode.

Advantageously, the holder is obliquely disposed in a flow passage relative to the flow direction of a fluid, wherein the other end of the connecting terminal opposing to one end thereof that is connected to the electrode of the sensing element is extended to a control circuit substrate for controlling the sensing element, bent to be substantially parallel to a connecting terminal insertion opening that is linearly formed at the outer edge of the control circuit substrate and then inserted in the connecting terminal insertion opening for connection.

Preferably, the metal member is disposed on the bottom surface of the housing to cover a part of or all over the reverse side of the sensing element and a part of the metal member is connected to a power ground or an electromagnetic shielding member to form an electromagnetic shielding structure for insulating the electromagnetic noise radiated on the sensing element.

Advantageously, a recessed adhesive agent storage portion for storing the extruded adhesive agent is provided near a portion where the adhesive agent is applied to fixedly bond the sensing element in the housing portion of the holder.

Preferably, the adhesive agent storage portion is provided between a portion where the adhesive agent is applied and a diaphragm portion formed on the upper surface of the sensing element.

Advantageously, the adhesive agent storage portion is formed as a groove to cover the outer periphery of the portion where the adhesive agent is applied.

Preferably, an extension portion having a recessed step extended outward from the side of the sensing element is provided on the side of the housing portion to surround the portion where the adhesive agent is applied for fixedly bonding the sensing element.

The above and other objects, features and advantages of the present invention will become more apparent from the following description when taken in conjunction with the accompanying drawings.

BRIEF DESCRIPTION OF THE ACCOMPANYING DRAWINGS

Figure 1:
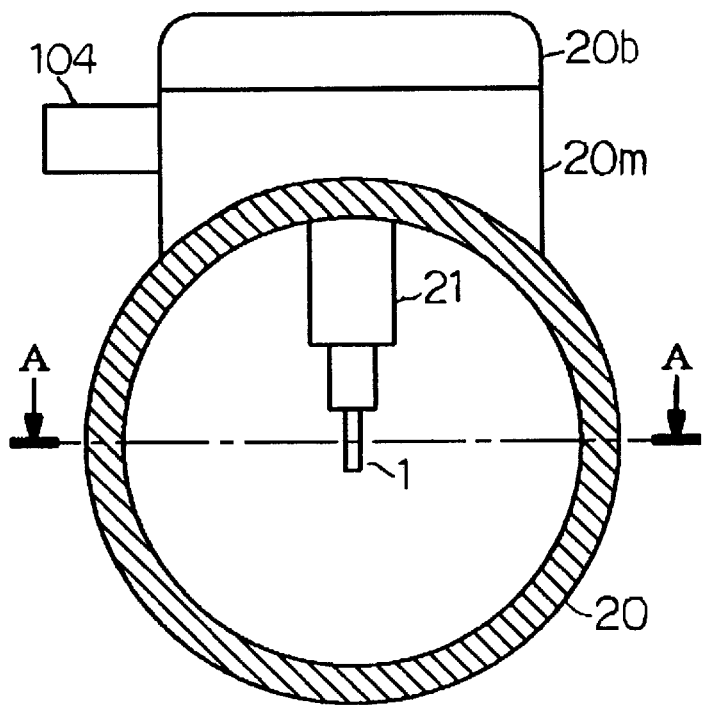
FIG. 1 is a view as seen from upstream of a thermo-sensitive type flow rate sensor according to a first embodiment.
Figure 7:
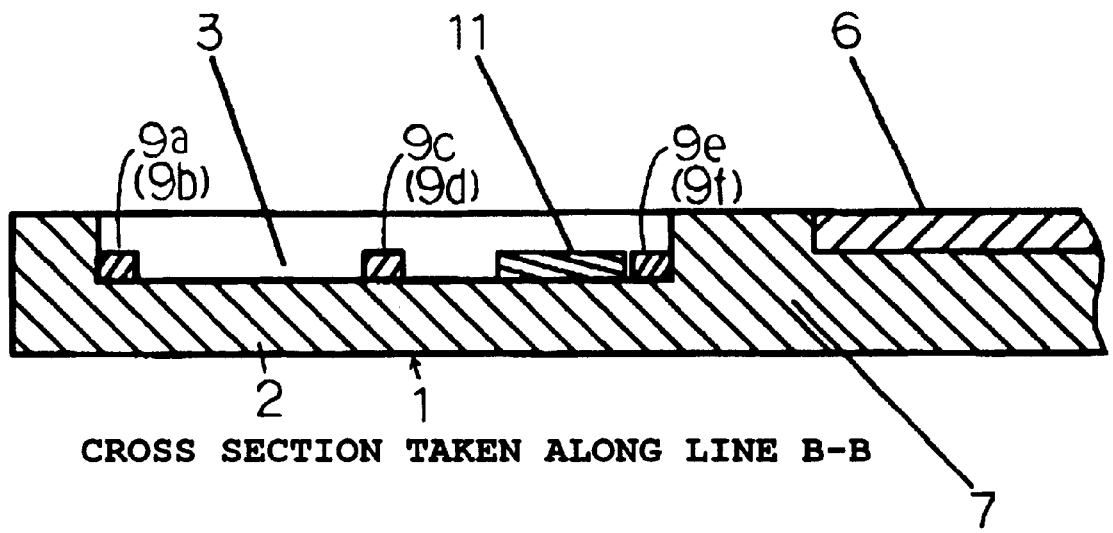
Figure 8:
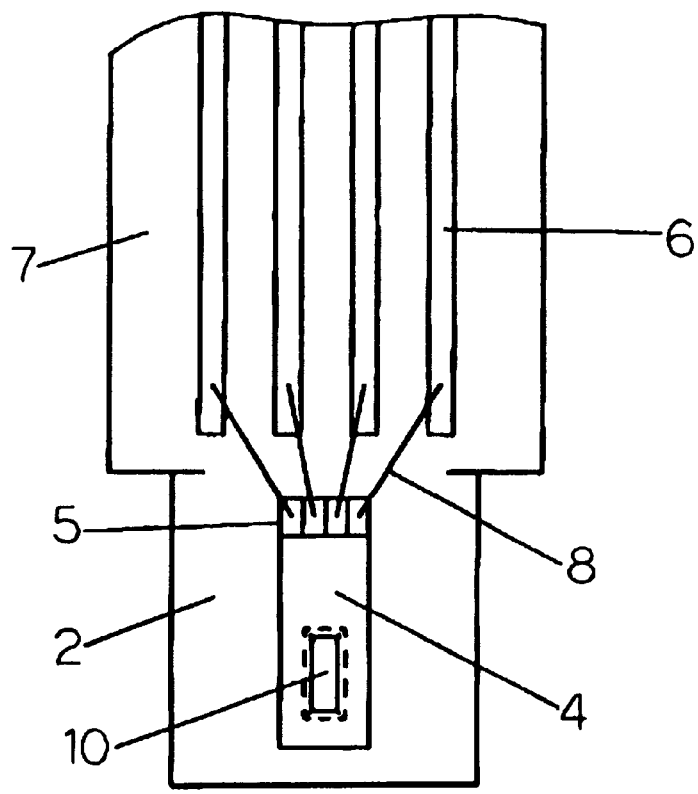
Figure 9:
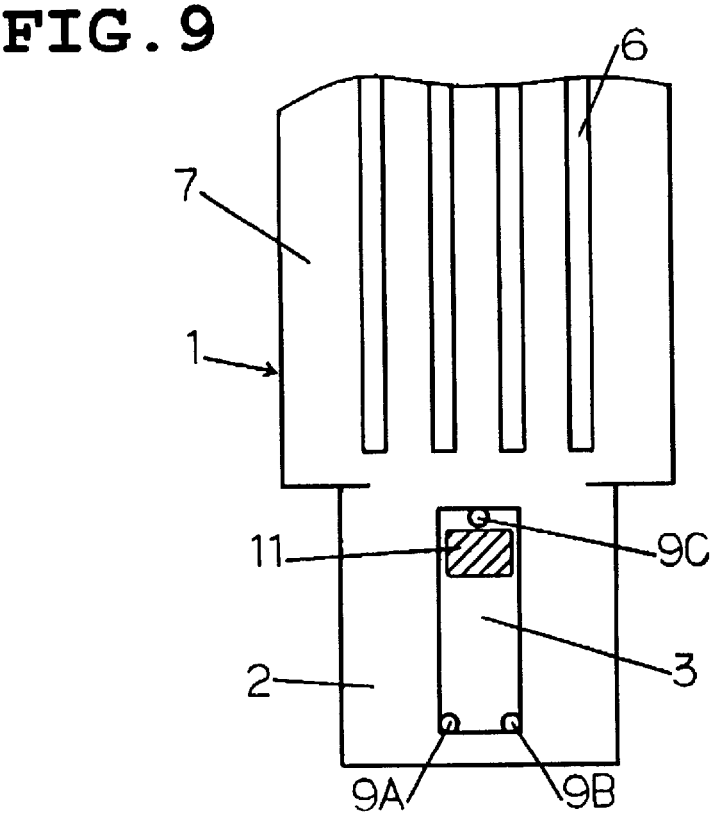
Figure 10:
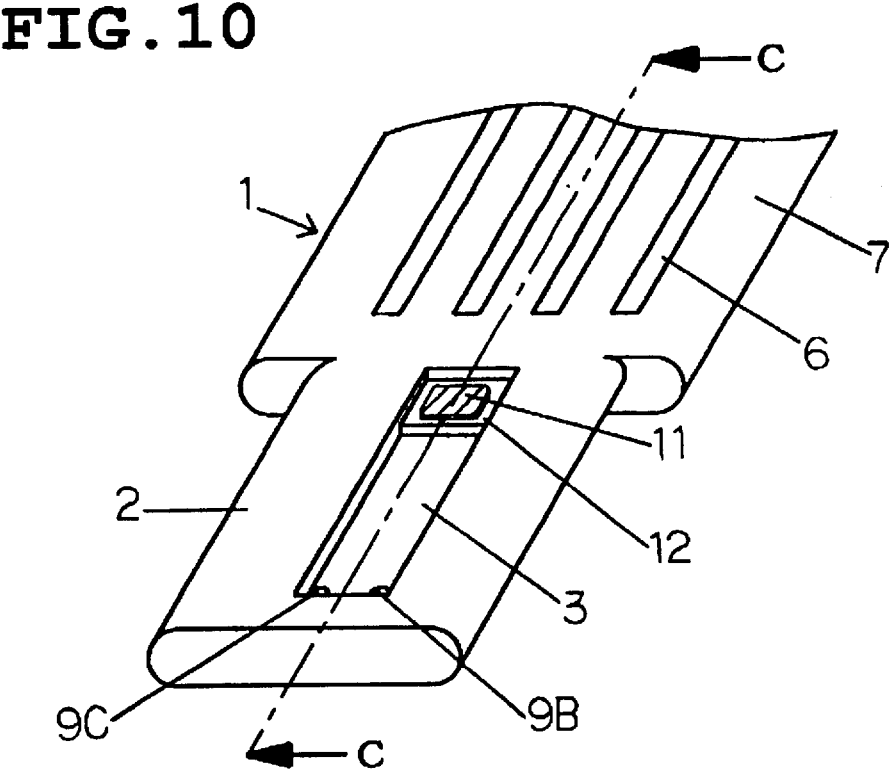
Figure 11:
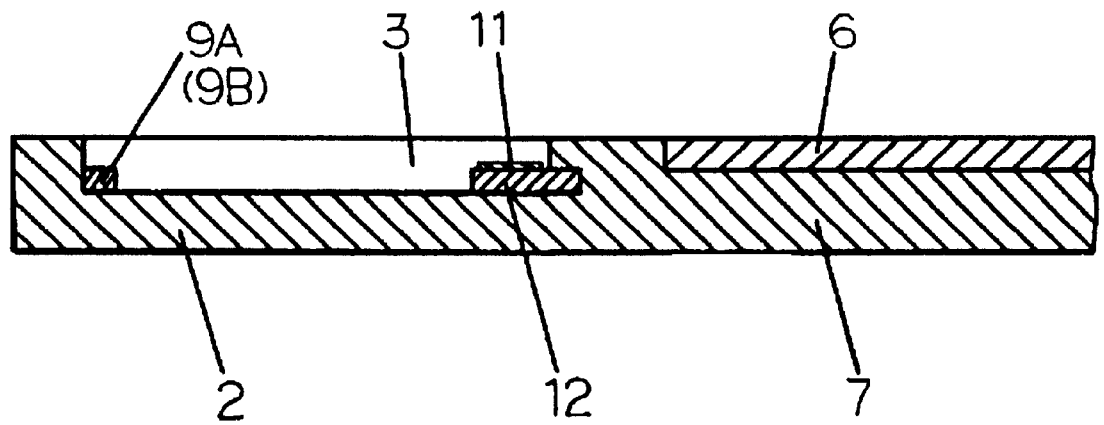
Figure 12:
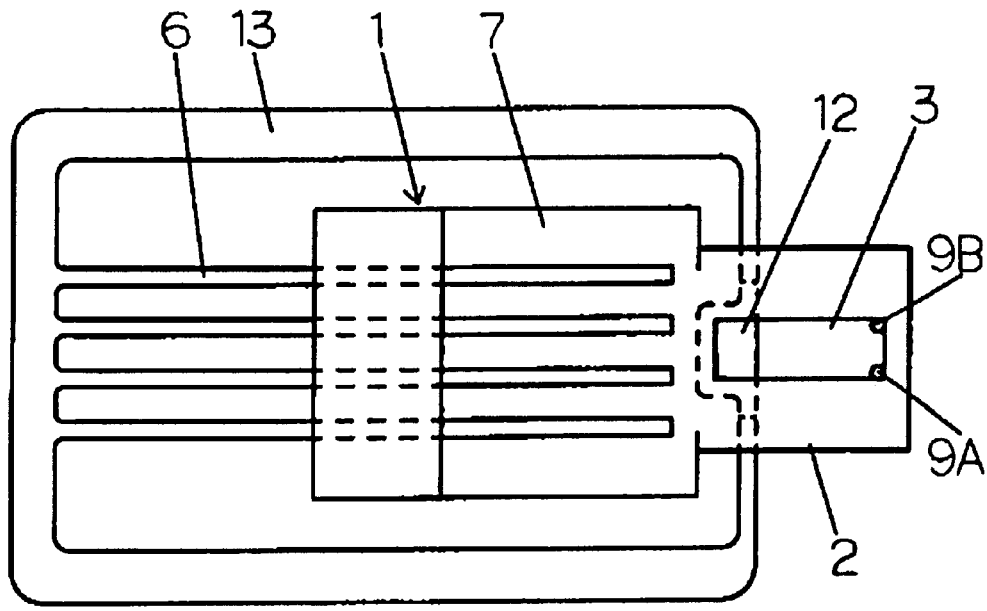
Figure 13:
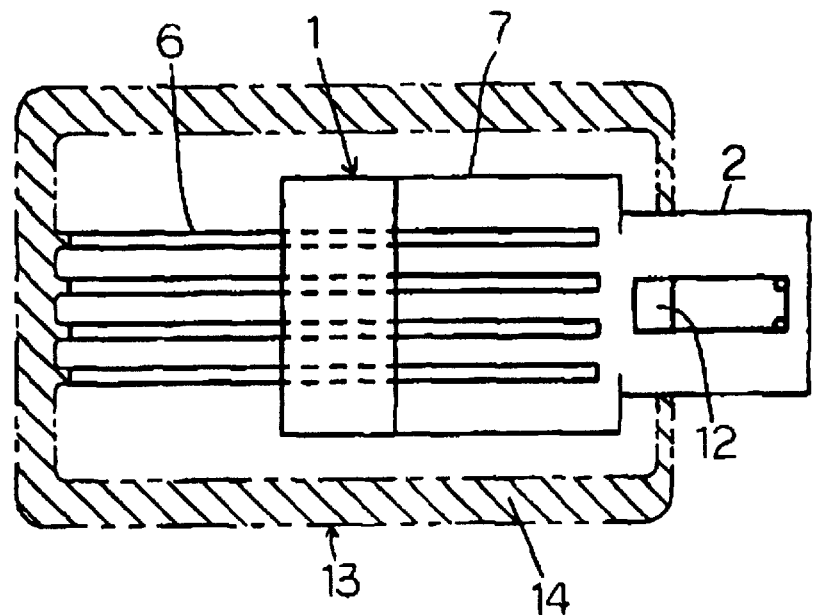
Figure 14:
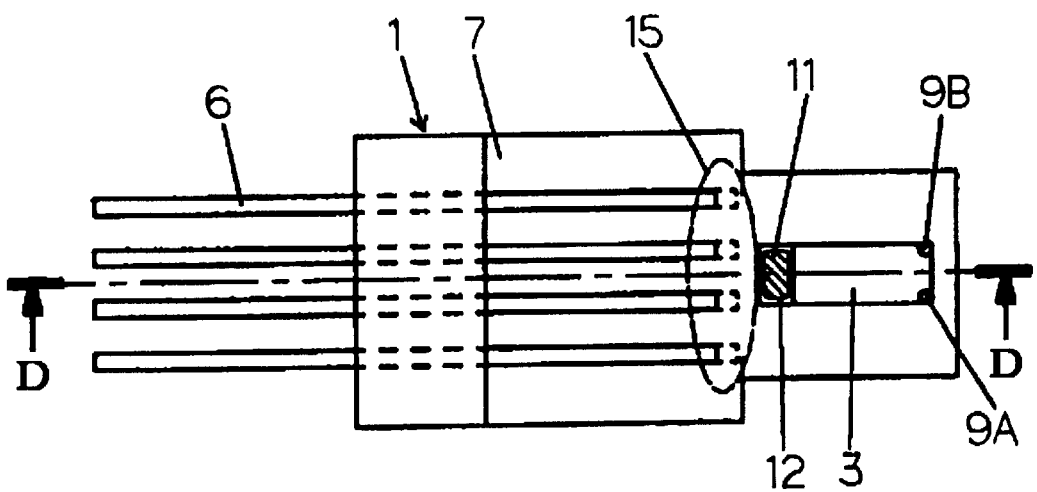
Figure 15:
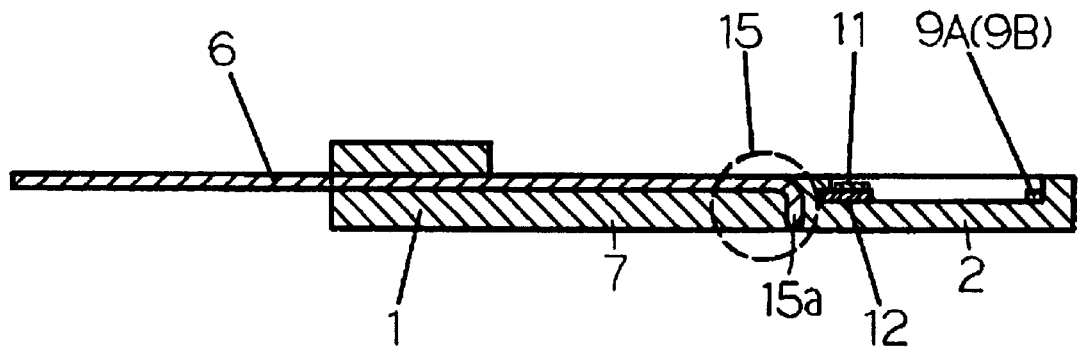
Figure 16:
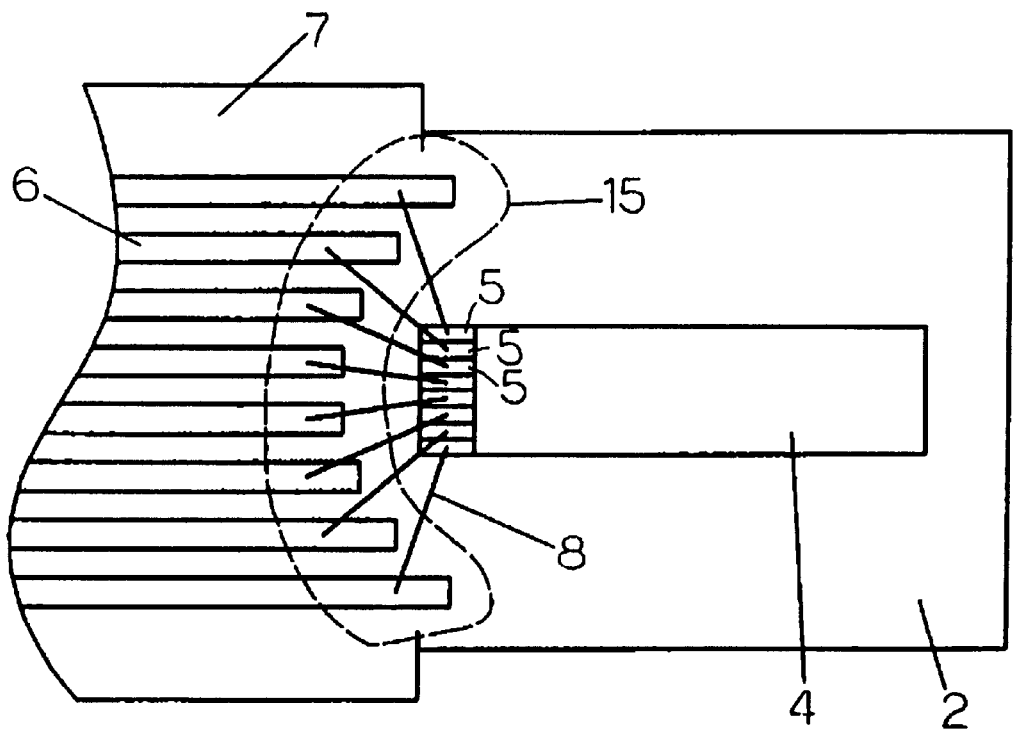
Figure 17:
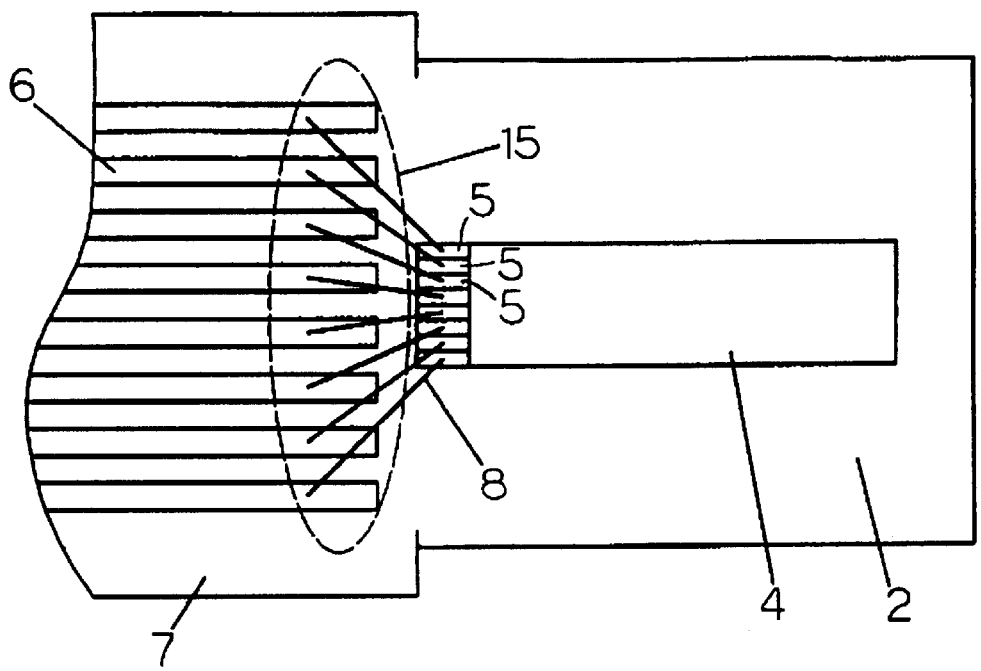
Figure 18:
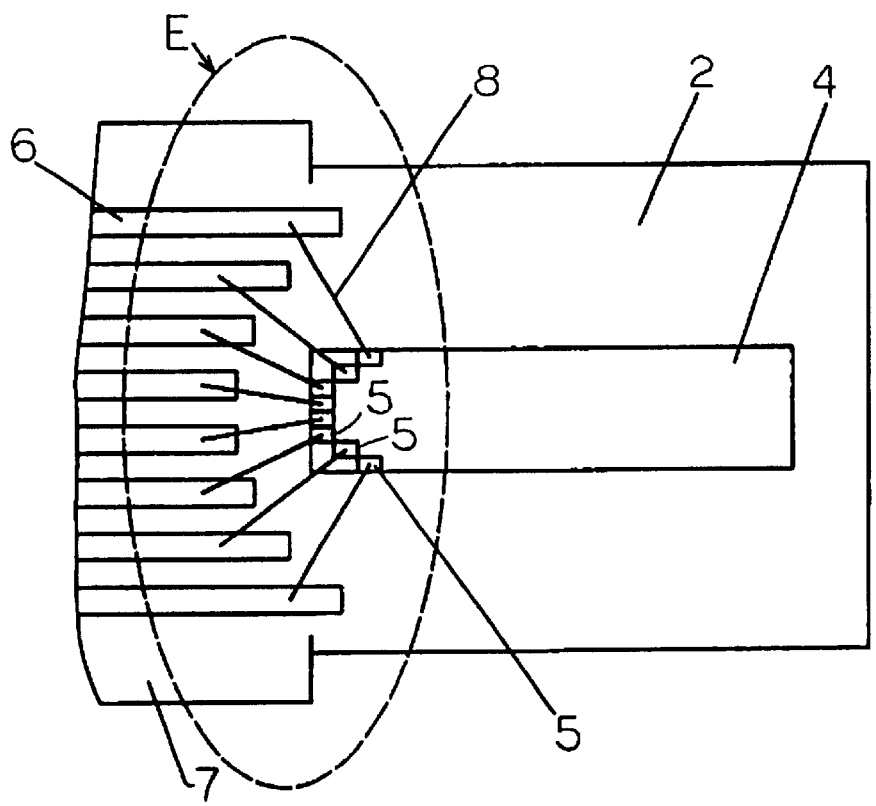
Figure 19:
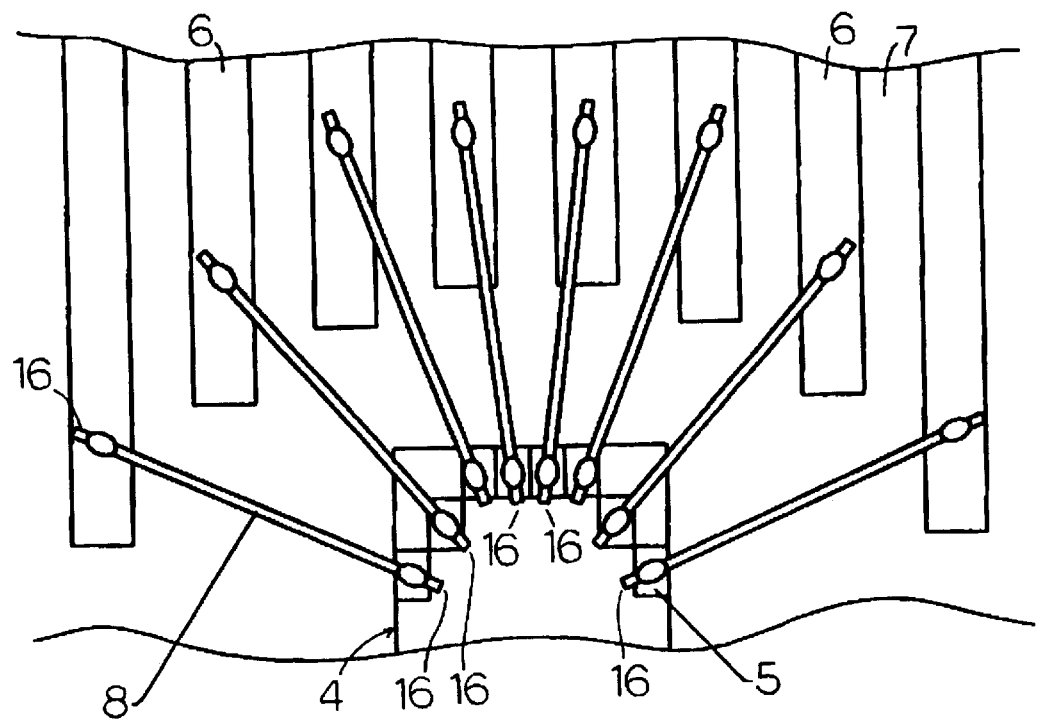
Figure 20:
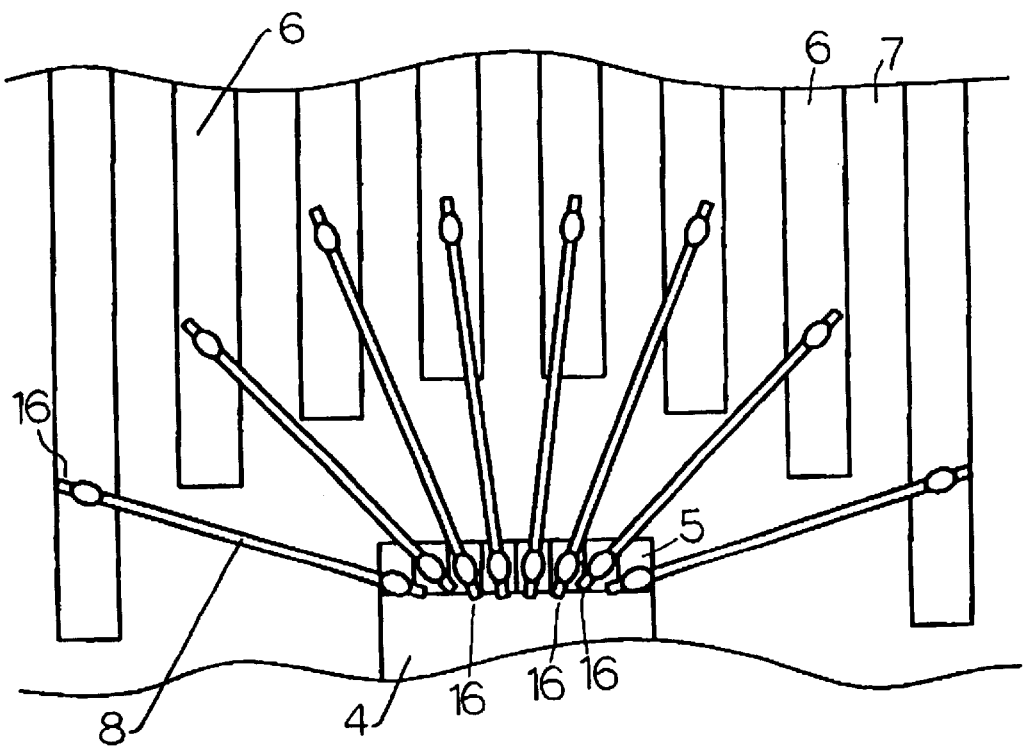
Figure 21:
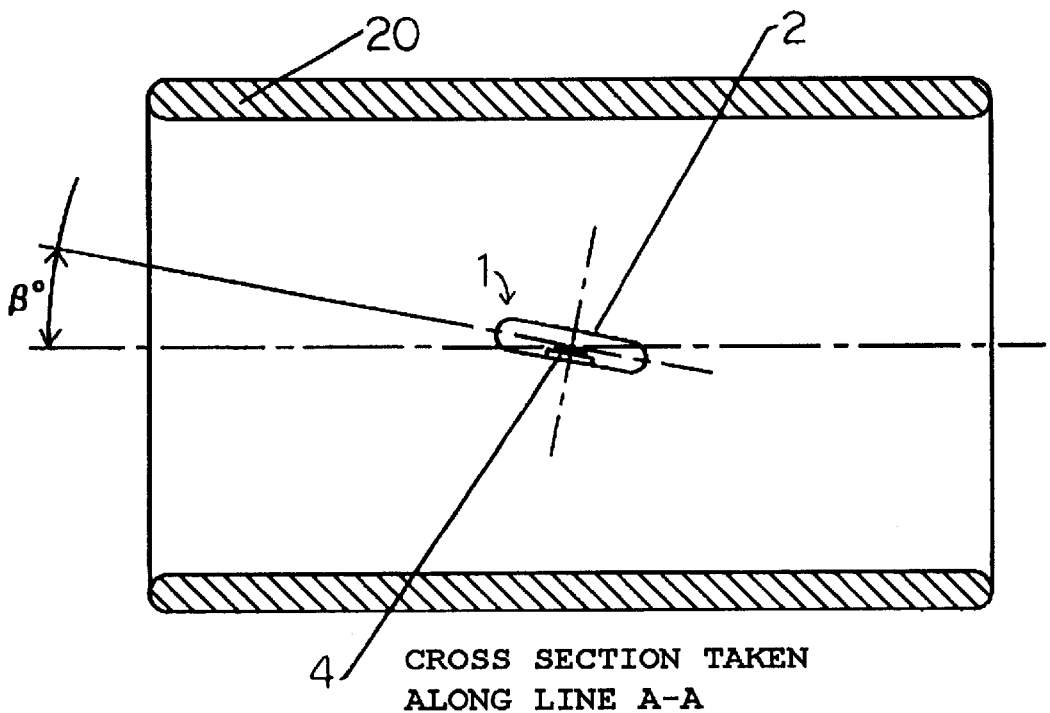
Figure 22:
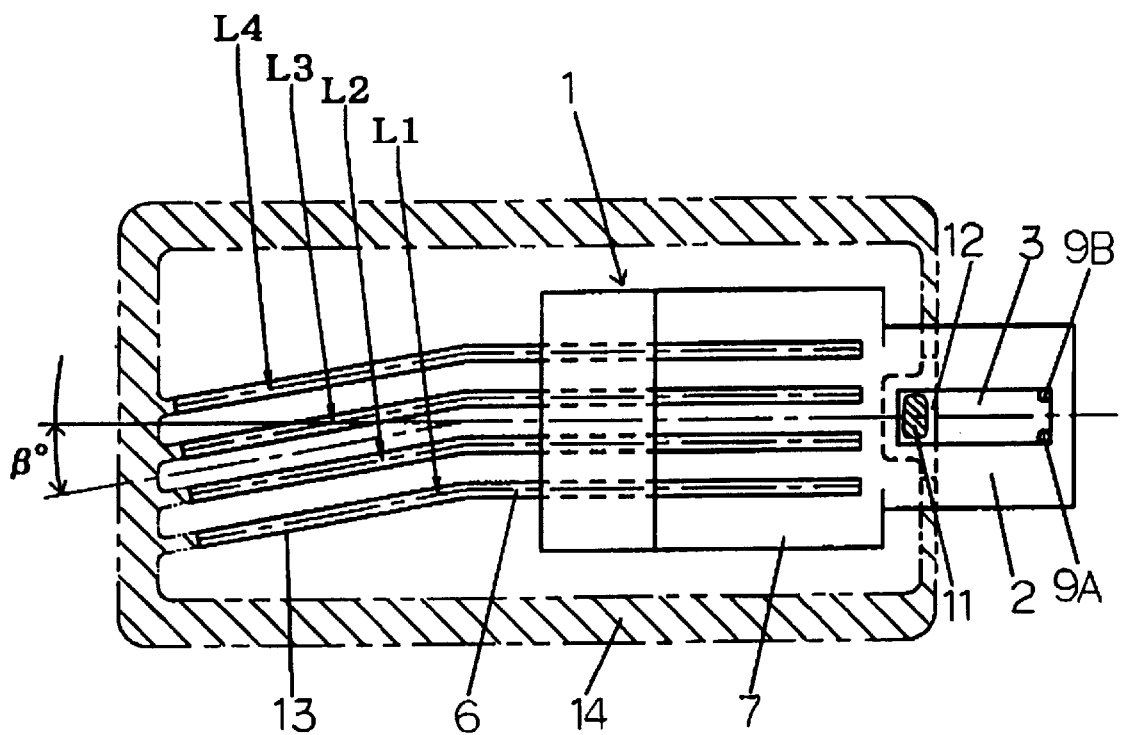
Figure 23A:
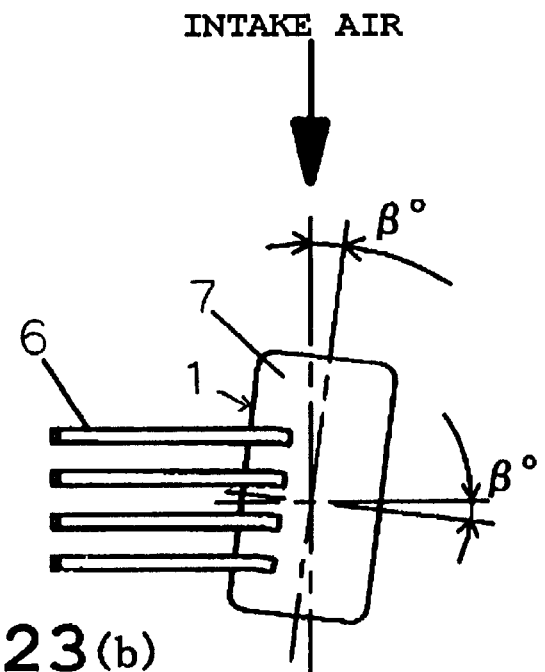
Figure 25:
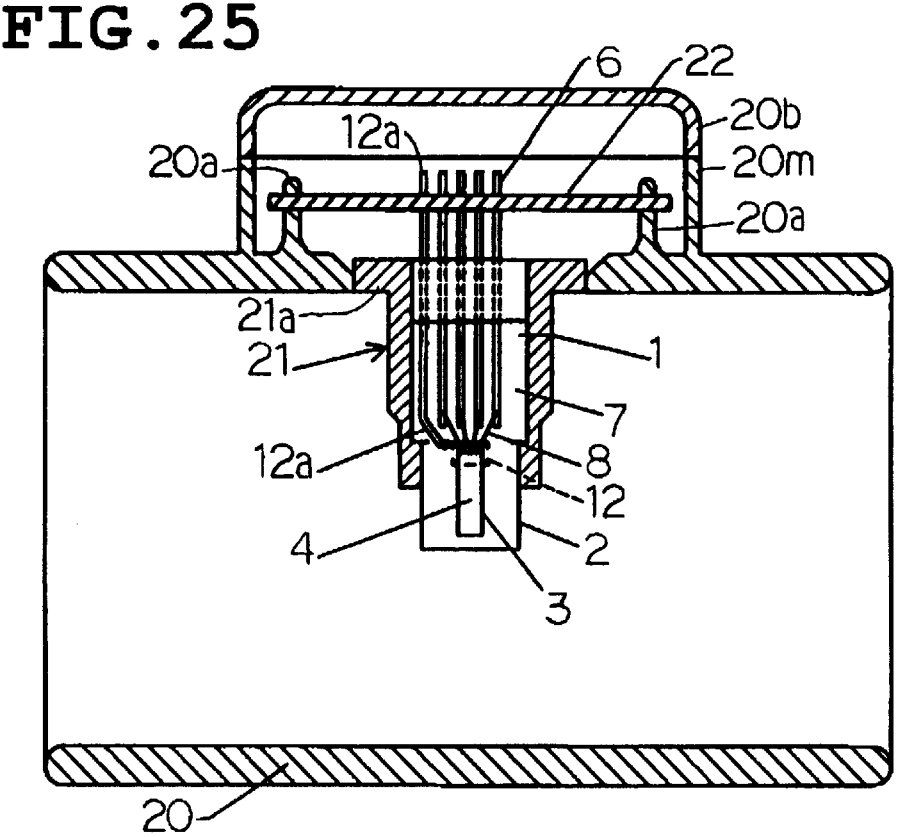
Figure 26:
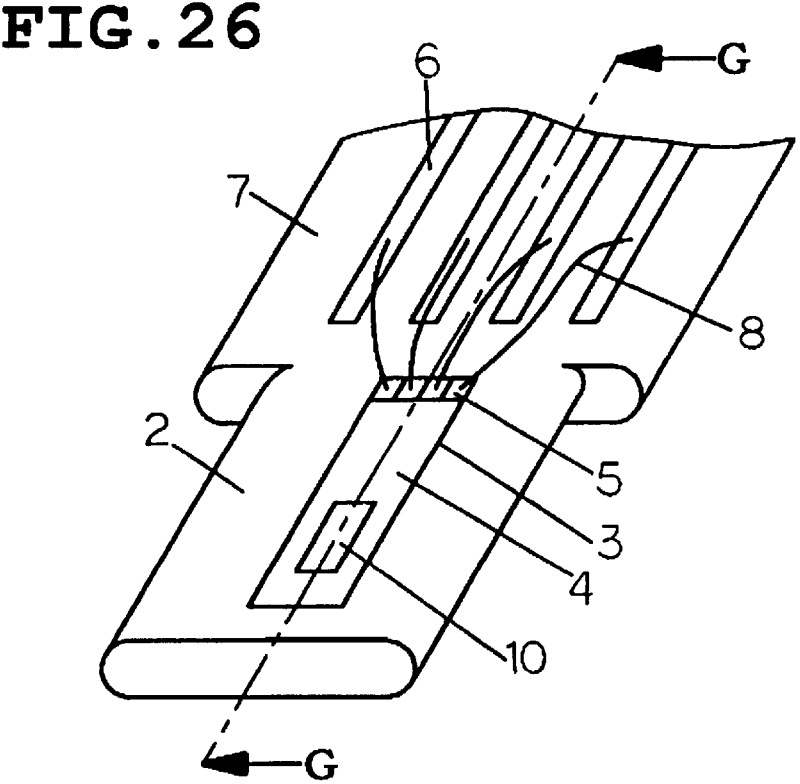
Figure 27:
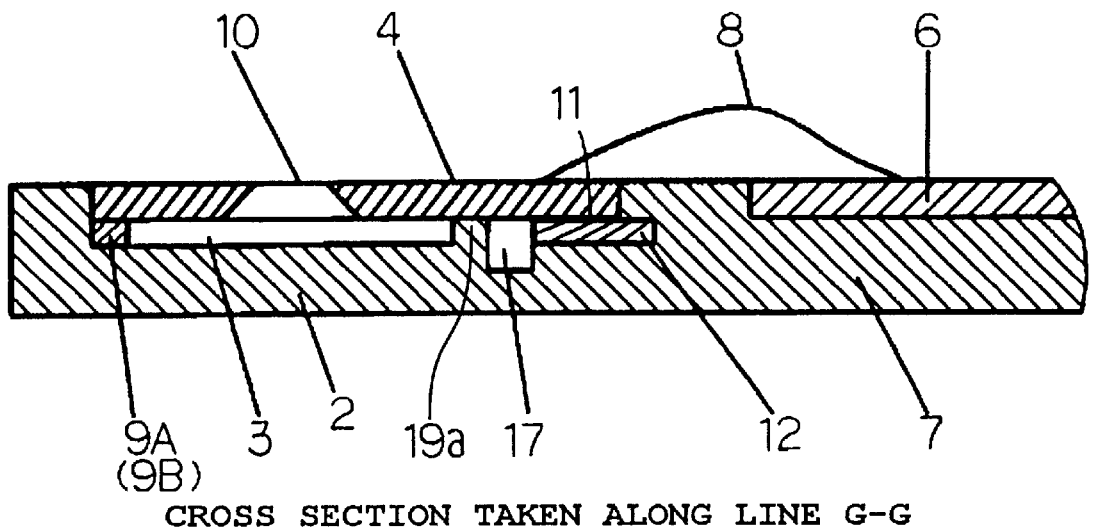
Figure 28:
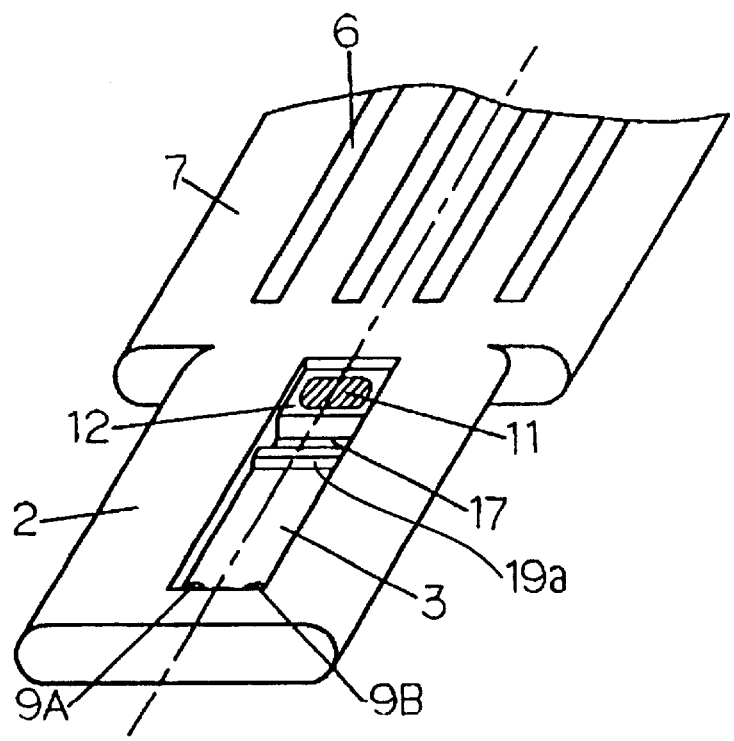
Figure 29:
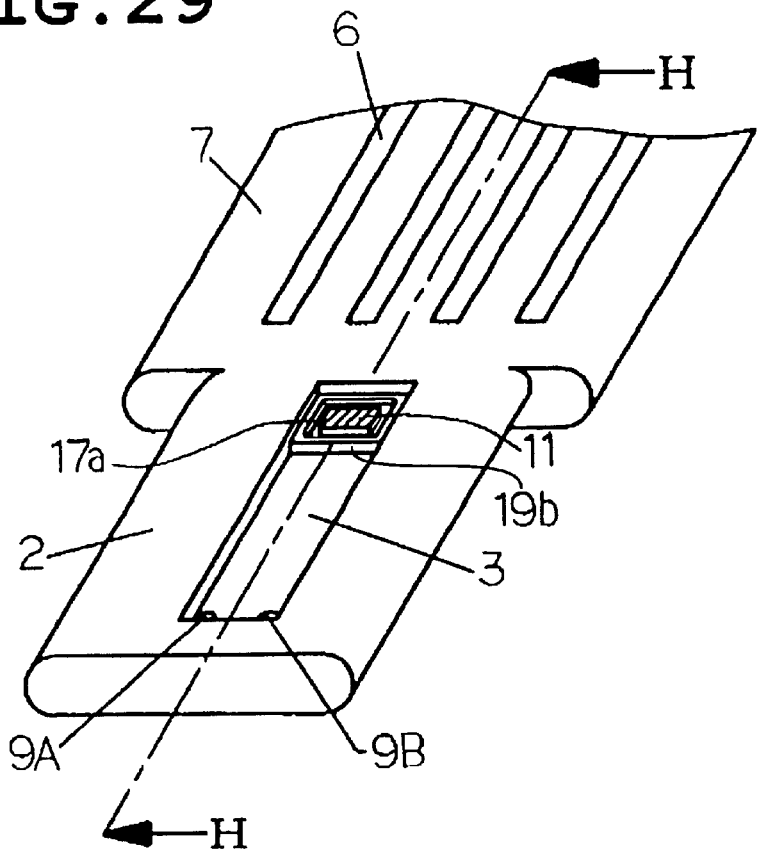
Figure 30:
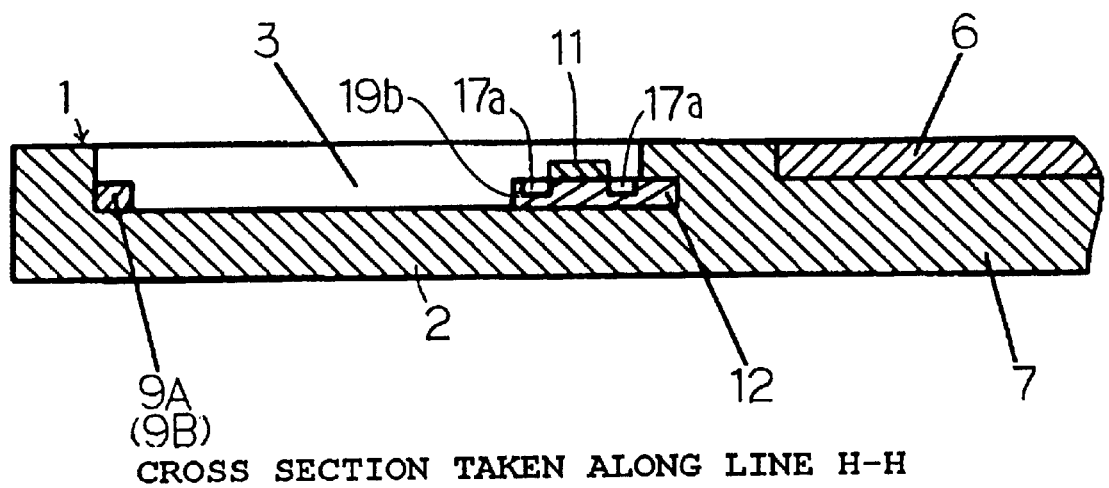
Figure 31:
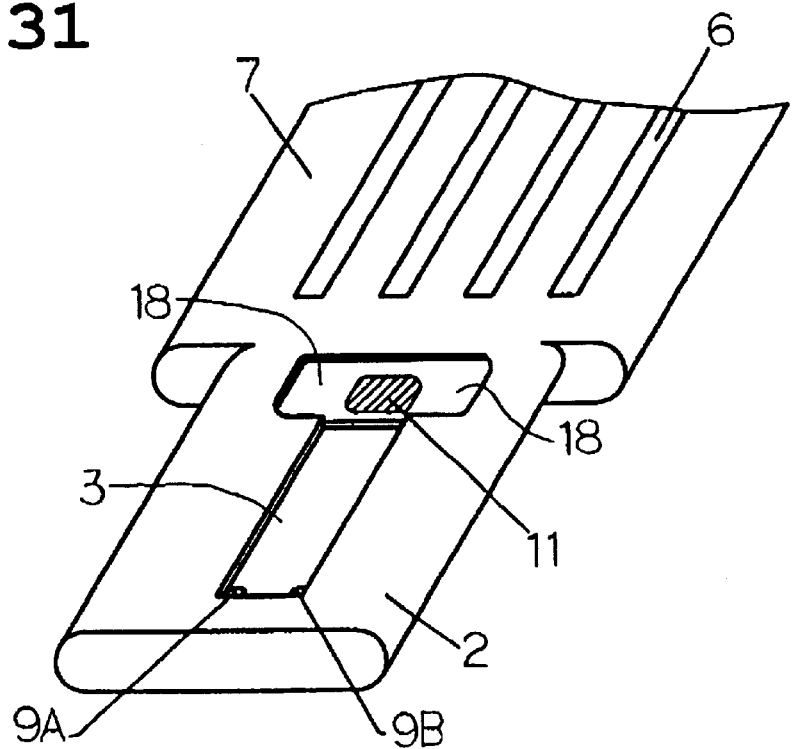
Figure 32:
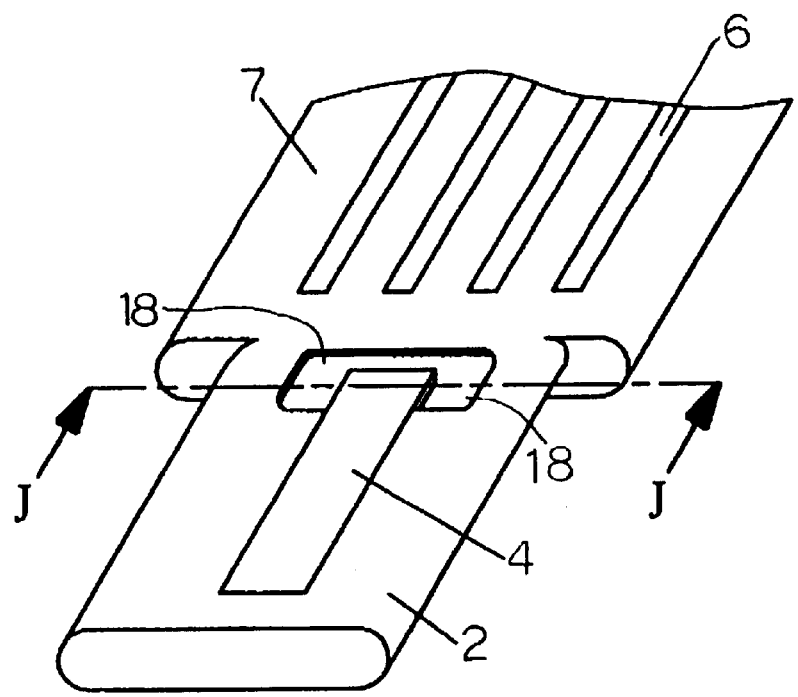
Figure 33:
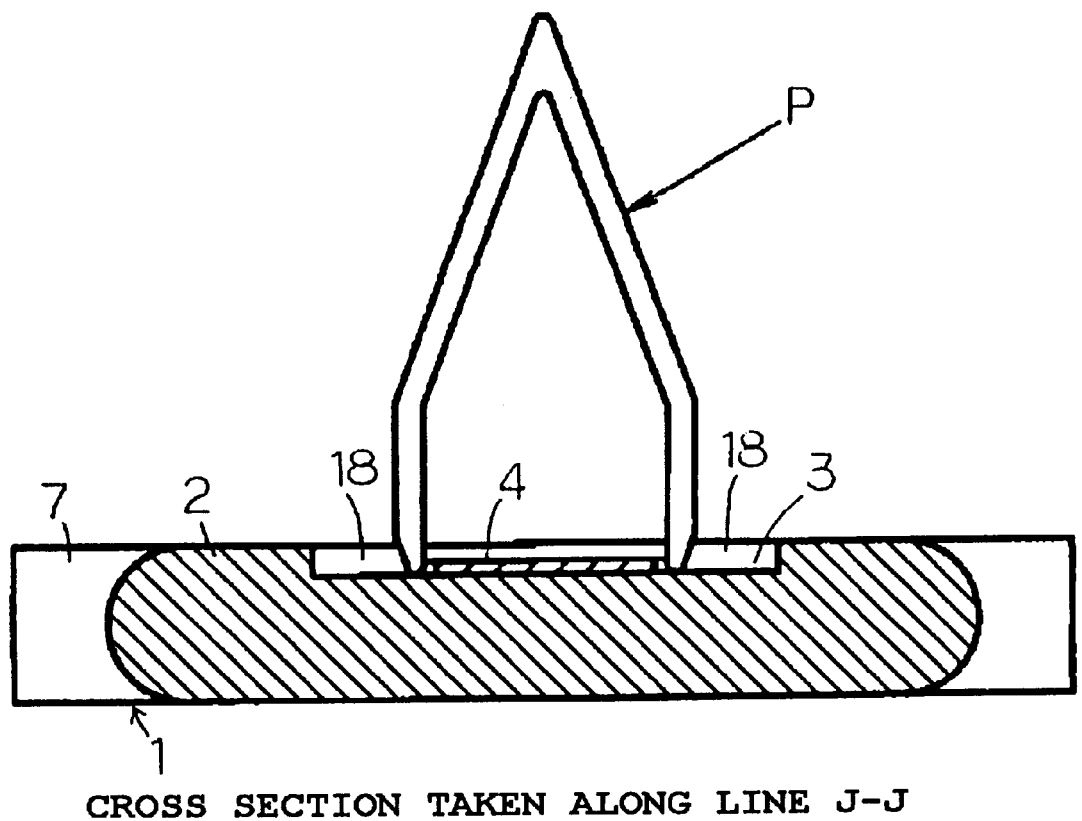
Figure 34:
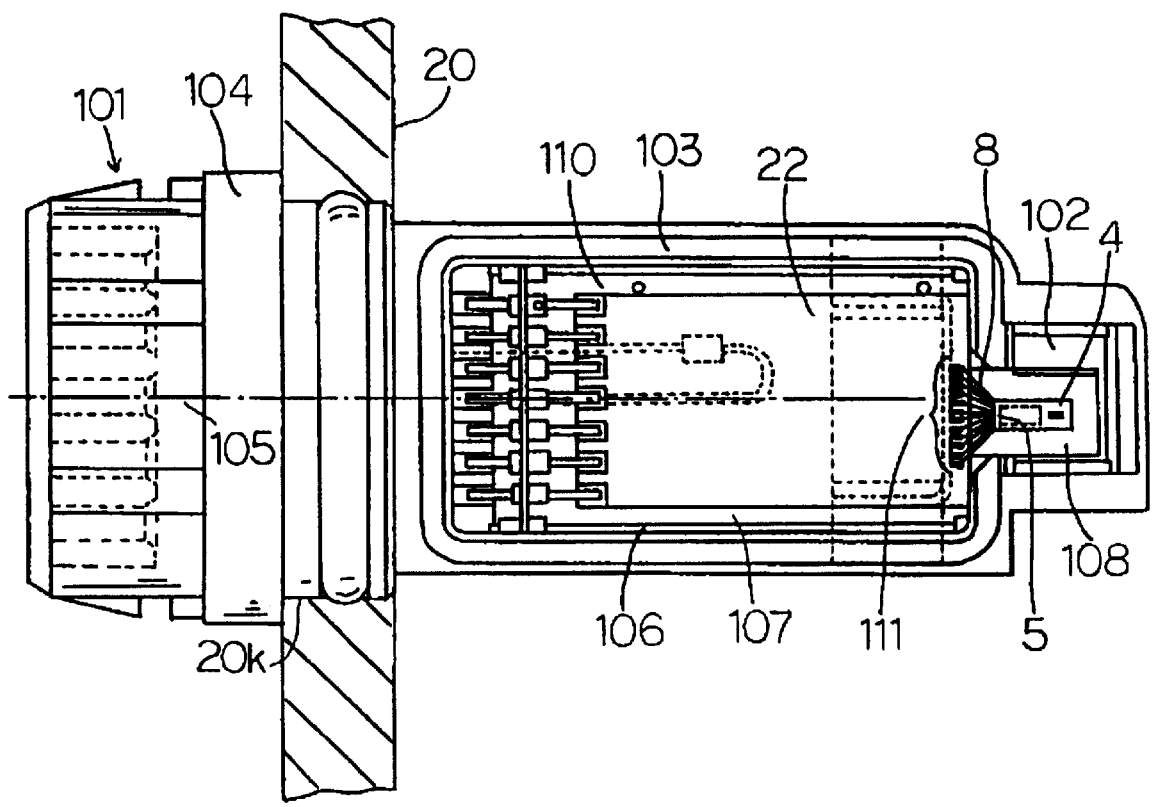
Figure 35:
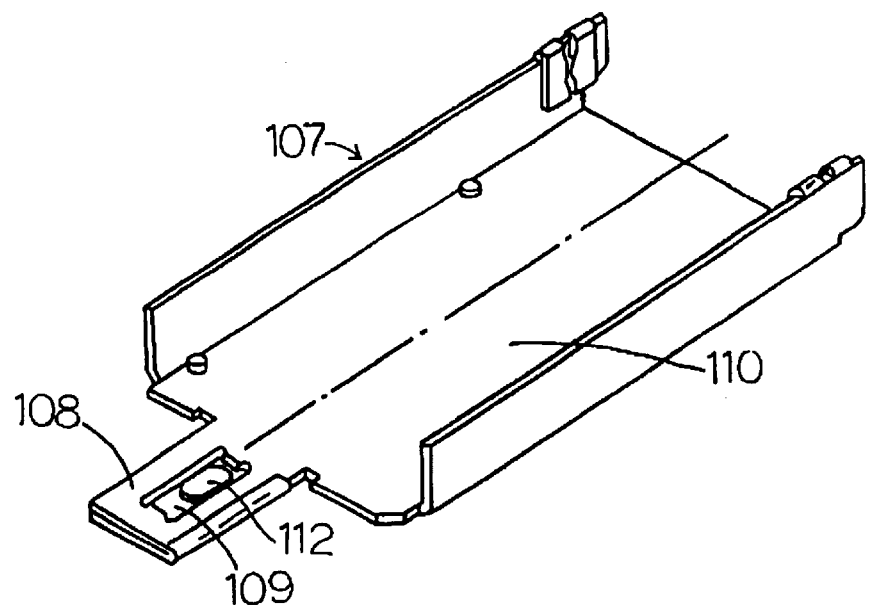

FIGS. 5(a), (b), (c), (d), (e) and (f) are cross-sectional views showing a wing shape of a rectification structure portion according to the first embodiment;

FIG. 6 is a perspective view showing an essential component of a holder according to a second embodiment;

FIG. 7 is a cross-sectional view taken along line B—B of FIG. 6;

FIG. 8 is a plan view showing an essential component employed in a condition where a sensing element is disposed in a holder according to a third embodiment;

FIG. 9 is a plan view of an essential component utilized in the holder according to the third embodiment;

FIG. 10 is a perspective view of an essential component employed in a holder according to a fourth embodiment;

FIG. 11 is a cross-sectional view taken along line C—C of FIG. 10;

FIG. 12 is a plan view when a holder is made according to a fifth embodiment;

FIG. 13 is a plan view showing a removal portion of a lead frame in a manufacturing process of the holder according to the fifth embodiment;

FIG. 14 is a plan view of a holder according to a sixth embodiment;

FIG. 15 is a cross-sectional view taken along line D—D of FIG. 14;

FIG. 16 is a plan view showing an essential component in a condition where a sensing element is disposed on a holder according to a seventh embodiment;

FIG. 17 is a plan view comparatively explaining an effect according to the seventh embodiment;

FIG. 18 is a plan view of an essential component in a condition where a sensing element is disposed on a holder according to an eighth embodiment;

FIG. 19 is an enlarged plan view showing an E portion of FIG. 18;

FIG. 20 is a plan view for comparatively explaining an effect of the holder according to the eighth embodiment;

FIG. 21 is a cross-sectional view taken along line A—A of FIG. 1 according to a ninth embodiment;

FIG. 22 is a plan view showing a condition before a holder is bent according to the ninth embodiment;

FIGS. 23(a), (b) and (c) are top, side and plan views showing a condition after the holder is bent according to the ninth embodiment;

FIG. 24(a) is a side view showing a condition where the holder and a control circuit substrate are assembled according to the ninth embodiment and FIG. 24(b) is a plan view as viewed from the direction of the control circuit substrate;

FIG. 25 is a cross-sectional view showing an essential component employed in a thermo-sensitive type flow rate sensor according to a tenth embodiment;

FIG. 26 is a perspective view of an essential component showing a condition that a sensing element is disposed on a holder according to an eleventh embodiment;

FIG. 27 is a cross-sectional view taken along line G—G of FIG. 26;

FIG. 28 is a perspective view showing an essential component utilized in the holder according to the eleventh embodiment;

FIG. 29 is a perspective view showing an essential component utilized in a holder according to a twelfth embodiment;

FIG. 30 is a cross-sectional view taken along line H—H of FIG. 29;

FIG. 31 is a perspective view showing an essential component employed in a holder according to a thirteenth embodiment;

FIG. 32 is a perspective view of an essential component showing a condition that a sensing element is disposed on the holder according to the thirteenth embodiment;

FIG. 33 is a cross-sectional view taken along line J—J of FIG. 32;

FIG. 34 is a cross-sectional view of an essential component employed in the conventional thermo-sensitive type flow rate sensor; and FIG. 35 is a perspective view of a case utilized in the conventional thermo-sensitive type flow rate sensor.

DESCRIPTION OF THE PREFERRED EMBODIMETS

Now, embodiments of the present invention will be described with reference to the drawings.

1st Embodiment

Figure 2:
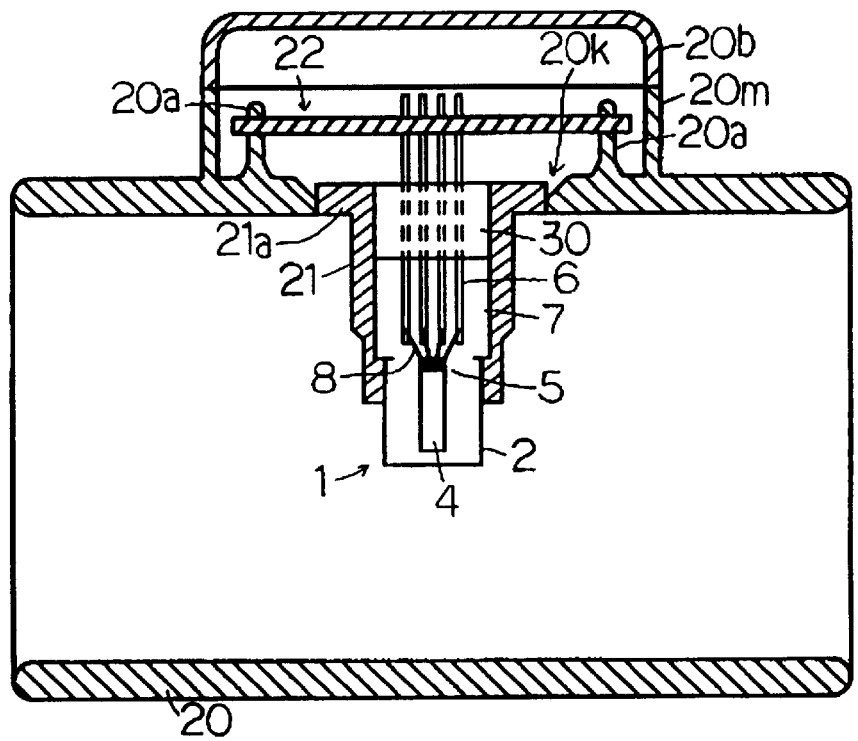
FIG. 2 is a cross-sectional view showing an essential component employed in the thermo-sensitive type flow rate sensor according to the first embodiment.
Figure 3:
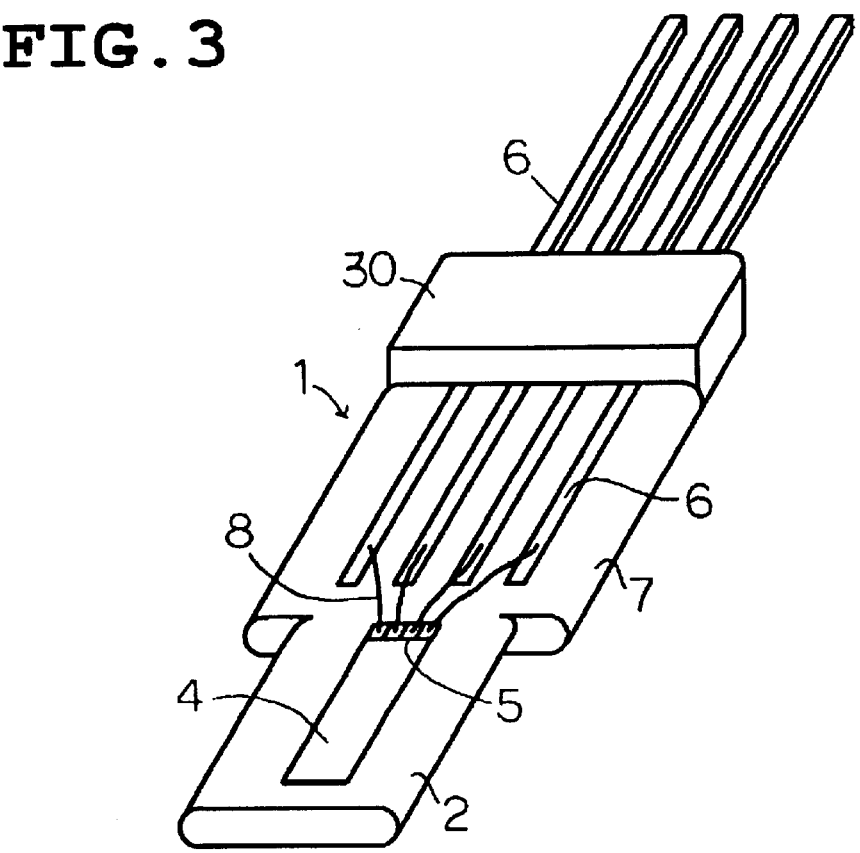
FIG. 3 is a perspective view showing the condition where a sensing element is disposed in a holder according to the first embodiment.
Figure 4:
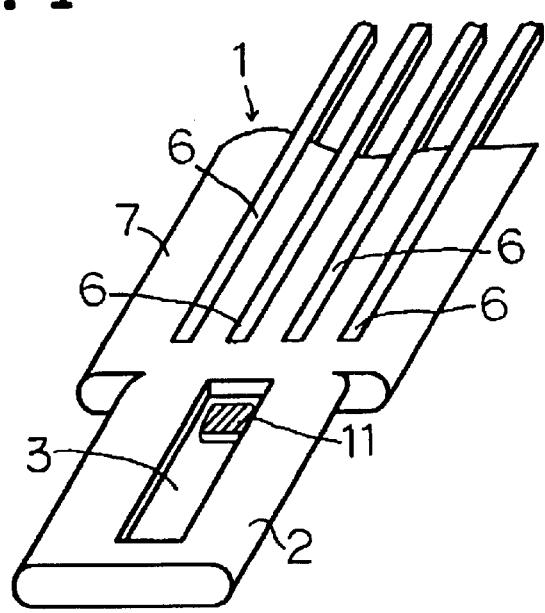
FIG. 4 is a perspective view showing an essential component utilized in the holder according to the first embodiment.

FIGS. 1 through 4 show a structure of a thermo-sensitive type flow rate sensor according to a first embodiment of the present invention and this thermo-sensitive type flow rate sensor is illustrated to detect an air flow rate flowing into an internal combustion engine for, for example, automobiles. FIG. 1 is a view of the thermo-sensitive type flow rate sensor as seen from the upstream and FIG. 2 is a cross-sectional view showing an essential component of FIG. 1. FIG. 3 is a perspective view showing a condition that a sensing element is disposed on a holder and connected thereto by a bonding wire. FIG. 4 is a perspective view showing an essential component utilized in the holder, wherein the portions in each drawing which are equivalent to those of the conventional thermo-sensitive type flow rate sensor shown in FIGS. 34 and 35 are denoted by the same reference numerals as the latter.

In the first embodiment, as shown in FIGS. 3 and 4, the holder comprises a rectification structure portion 2 provided with a housing portion 3 (FIG. 4) for disposing a sensing element 4 therein, and a terminal securing portion 7 serving as a connecting terminal securing portion which has a plurality of bar-like terminals 6 serving as a connecting terminal embedded in parallel therein. The rectification structure portion 2 and terminal securing portion 7 are integrally formed by insulating material such as resin.

As described above, the sensing element 4 and the terminals 6 are electrically connected by wire bonding such as an aluminum wire. However, when an automatic bonder (a bonding machine) is utilized, it is important how precisely relative position of electrodes 5 on the sensing element 4 and the terminals 6 is secured.

In this case, since each terminal 6 is embedded in a predetermined position of the terminal securing portion 7, the relative position of the electrodes 5 of the sensing element 4 and the terminals depends only on the accuracy of when the sensing element 4 is bonded and secured to the housing portion 3. That is, there is only one variation factor for assembly and the like.

As a result, positional accuracy remarkably improves compared with that of the conventional sensor shown in U.S. Pat. No. 5,631,416 and the like.

Therefore, when the automatic bonder is utilized, once the bonding position is set, it is possible to provide stable bonding because deviation from the desired position is small. Further, since the rectification structure portion 2 is formed from resin, intake airflow is stably led to the periphery of the sensing element 4. It is therefore possible to easily devise a holder from a fluid engineering point of view and also improve the detection accuracy of the intake airflow rate or flow velocity.

The detailed structure of the first embodiment will now be described hereunder. Namely, as shown in FIG. 1, a main conduit 20 for example forms a part of intake system parts for automobiles and is adapted to introduce intake air. A holder 1 is disposed in the substantially central part of the longitudinal direction of the conduit 20 so that the tip portion of the holder 1 is situated in the center of the conduit 20.

As shown in FIG. 2, this holder 1 comprises the rectification structure portion 2, the terminal securing portion 7 and the holding portion 30, each being integrally formed by insulating material such as resin. This insulating material for example includes PBT (Polybutylene Terephthalate), PPS (Polyphenylene Sulfide), PET (Polyethylene Terephthalate), and general purpose engineering plastics such as nylon.

This holder 1 is held in the main conduit 20 through a cylinder 21. A flange 21a of the base of the cylinder 21 is engaged with an opening portion 20k of the main conduit 20. A projection 20a for securing the control circuit substrate 22 is arranged to project outward at the edge portion of the opening portion 20k formed on the outside of the cylinder 21 and engage with a securing hole formed on the control circuit substrate 22. Provided on the outer periphery of the projection 20a is a cylinder portion 20m for surrounding the outer periphery of the control circuit substrate 22. A cover body 20b is mounted on the upper portion of the cylinder portion 20m to cover the control circuit substrate 22. Disposed on the side of the cylinder portion 20m is a connector 104 for supplying the internal flow rate sensor with the power and breaking out the flow rate detection signal to the outside and a gland terminal of the connector 104 is connected to the control circuit substrate 22.

As shown in FIGS. 3–4, the rectification structure portion 2 is formed to have a round plate-like shape on both sides and when the sensing element 4 is fixedly secured to the housing portion 3, the rectification structure portion 2 becomes a fin plate for stably introducing an airflow sucked into the main conduit 20 to the periphery of the sensing element 4. The rectification structure portion 2 is provided at its substantially central portion with the housing portion 3, which is slightly larger than an external form of the sensing element 4 and has a rectangular recess depressed from the surface, for disposing the sensing element 4 in a predetermined position. The housing portion 3 is provided at the bottom surface with a die bonding portion 11 where an adhesive agent is applied for fixedly securing the sensing element 4. The die bonding portion 11 is designed to have such predetermined depth that the upper surface of the sensing element 4 when mounted has the same height as the surface of the holder 1. When the sensing element 4 is mounted on the housing portion 3, a flat or round surface is formed by the upper surface of the sensing element 4 and the surface of the holder 1. Namely, the upper surface of the sensing element 4 is designed to be flush with the surface of the holder 1. Thus, as the outer periphery of the rectification structure portion 2 is formed, it is possible to rectify the flow of a fluid flowing into the periphery thereof and improve the detecting sensitivity of the sensing element 4.

In this case, 4 minute electrodes 5 are formed in a line on the upper end surface of the sensing element 4 on the terminal 6 side, wherein an exothermic resistor and a thermometric resistor (both not shown) are formed and connected to the electrodes 5.

The terminal securing portion 7 serving as a connecting terminal securing portion is formed in a plate shape, but it is wider than the rectification structure portion 2 and has round fin-plate shape on both sides, wherein 4 bar-like terminals 6 are disposed in parallel.

These terminals 6 are made of a conductor that utilizes, for example, copper, a copper alloy, an iron-nickel alloy and the like. These terminals 6 are integrally formed at the same time when the holder 1 is formed. Namely, the bar-like, i.e. narrow thin plate-like terminals 6 are embedded in the surface of the terminal securing portion 7 by insert molding so that the surface of the terminals 6 is exposed and each end thereof is arranged to face the electrode 5 of the sensing element 4.

Each terminal 6 end is electrically connected to each electrode 5 of the sensing element 4 by a wire made of for example aluminum. The central portions of the terminals 6 are held by a holding portion 30 which is thicker in the surface direction than the base side of the terminal securing portion 7. The other ends of the terminals 6 project through the holding portion 30 in the rear direction to extend on the control circuit substrate 22 on which they are connected by soldering and the like. An output signal from the sensing element 4 corresponding to the intake airflow or flow velocity is obtained through these terminals 6.

The rectification structure portion 2 is explained here to have the round fin-plate shape on both sides, but as shown in FIGS. 5(a) through (f), it may be formed to have a wing-shape. In FIG. 5, there are shown 6 wing-shapes as examples. Each shape has a minute minimum resistance coefficient of for example 0.004~0.009.

Further, the surface of the rectification structure portion 2 is explained here to have a flat surface, but a convex projection or a concave intake portion may be formed on the surface or reverse side of the rectification structure portion 2. The flow of the fluid on the periphery is thus rectified and a hydrodynamic boundary layer developing from the rectification structure portion 2 may be controlled.

2nd Embodiment

FIG. 6 is a perspective view showing an essential component of the holder according to a second embodiment and FIG. 7 is a cross section taken along line B—B of FIG. 6. In the 2nd embodiment, there are provided positioning portions 9a~9f in the housing portion 3 and the rest are the same as the 1st embodiment.

As shown in FIGS. 6~7, 6 columnar positioning portions are projectingly provided on the bottom surface of the housing portion 3 of the holder 1. These positioning portions 9a~9f are formed on the front, rear and center of the housing portion 3 and project from the bottom surface of the housing portion 3. Thus, they are designed to have such thickness that the upper surface of the sensing element 4 has the same height as the surface of the holder 1. With this thickness, mounting height of the sensing element 4 in the thickness direction is controlled.

The positioning portions 9a~9f are illustrated here as the columnar minute projections, but they are not limited to such shape, but may be formed to have desired shape projecting from the bottom surface of the housing portion 3.

In the 1st embodiment, when the sensing element 4 is mounted on the housing portion 3, die bonding paste is applied as an adhesive agent to the die bonding portion 11. In this case, if the positioning portions 9a~9f are not provided there, the sensing element 4 may be mounted in a concave or convex condition relative to the surface of the rectification structure portion 2 by the flatness of the bottom surface of the housing portion 3 or uneven application amount of the adhesive agent. It is therefore easy to cause individual difference in the flow of the intake fluid on the periphery of the sensing element 4 and as a result, the detecting accuracy of intake airflow or flow velocity will be deteriorated.

However, in the 2nd embodiment, since the positioning portions 9a~9f are provided in the housing portion 3, the position of the height of the sensing element 4 in the thickness direction can be controlled even if there is unevenness of the application amount of the adhesive agent. It is therefore possible to control the positional deviation of the sensing element 4 in height and the detecting accuracy of the intake airflow or flow velocity can be secured. Further, since the holder 1 is made of resin, it is possible to easily form the positioning portions 9a~9f and these are suitable for mass production.

A gap is made between the reverse side of the sensing element 4 and the bottom surface of the housing portion 3 by the provision of these positioning portions 9a~9f. With this structure, it is possible to improve the detecting sensitivity of the sensing element 4. Namely, a calorie generating from the exothermic resistor formed on the upper surface of the sensing element 4 is basically deprived of the heat transfer by intake fluid. However, the sensing element 4 is mounted on the housing portion 3 of the holder 1 and heat of the exothermic resistor is also transferred by the holder 1 through the housing portion 3 and deprived. Increase of the heat transfer ratio to the holder 1 causes the decrease of the detecting sensitivity of the sensing element 4.

In the 2nd embodiment, since the gap is provided between the reverse side of the sensing element 4 and the bottom surface of the housing portion 3 as described above, the heat conduction amount to the holder 1 is controlled to improve the detecting sensitivity of the sensing element 4.

3rd Embodiment

FIG. 8 is a plan view of an essential component utilized in FIG. 3 showing a holder according to a 3rd embodiment and FIG. 9 is a plan view corresponding to the plan view of an essential component employed in FIG. 4. In the 3rd embodiment, the structure is the same as that of the 1st embodiment except the positioning portions 9A~9C in the housing portion 3.

In the 3rd embodiment as shown in FIGS. 8–9, on the bottom surface of the housing portion 3 of the holder 1, two positioning portions 9A and 9B are disposed on the left and right sides of the end of the housing portion 3 near a diaphragm 10 which is provided on the upper surface of the sensing element 4, while one positioning portion 9C is disposed on the center of the other end of the housing portion 3. It is to be noted that the exothermic resistor and the thermometric resistor (both not shown) are formed on the diaphragm 10.

In the 2nd embodiment, when the holder 1 is formed by for example resin and there is caused any difference of elevation between the positioning portions 9a and 9f, the height of the sensing element 4 is positioned by the higher position among them. Thus, there is some possibility that the diaphragm 10 may be complicatedly inclined relative to the flowing direction depending on which is higher among the positioning portions 9a~9f.

However, in the 3rd embodiment, since three positioning portions 9A, 9B and 9C are provided near the diaphragm 10 and the sensing element 4 is supported by these three points, it is possible to control the possible inclination of the diaphragm 10 in the flowing direction and thus secure the detecting accuracy.

4th Embodiment

FIG. 10 is a perspective view of an essential component showing a holder according to a 4th embodiment and FIG. 11 is a cross sectional view taken along line C—C of FIG. 10. In the 4th embodiment, a metal member 12 is provided on the bottom end of the housing portion 3 and the rest is the same structure as the 1st embodiment.

As shown in FIGS. 10–11, the metal member 12 is provided on the bottom surface of the housing portion 3 of the holder 1 by insert molding so that one end of the metal member 12 steps into one end surface of the terminal 6 side of the housing portion 3.

In the 1st embodiment described above, when the sensing element 4 is mounted on the housing portion 3, it is secured by applying the adhesive agent on the die bonding portion 11. In the 4th embodiment, the die bonding portion 11 is formed by applying die bonding paste on the upper exposed surface of the metal member 12. The thickness of the metal member 12 is equivalent to the height of the positioning portion 9C. When the sensing element 4 is fixedly secured to the metal member 12, it is supported at the opposite end by the positioning portions 9A and 9B. As a result, the above-mentioned possible inclination is controlled to allow the sensing element 4 to stably assemble (by controlling the unevenness).

With this structure, it is possible to improve the adhesive property of the sensing element 4 compared with when the die bonding paste is applied on the bottom surface of the housing portion 3 made of resin, and the stiffness of the portion directly under the position where the electrode 5 of the sensing element 4 is situated can be increased.

Accordingly, when the wire bonding made of aluminum is for example used for electric connection between the electrode 5 of the sensing element 4 and the terminal 6, it is possible to lower the transfer failure of ultrasonic energy used and provide stable wire bonding.

Further, copper or copper alloy may be used for the material of the metal member 12. Also, material such as iron nickel alloy, the coefficient of linear thermal expansion of which is similar to silicon and the like which are the substrate for the sensing element 4 may be used. Thus, it is possible to secure the reliability of the wire bonding portion even under such a sever environment that is subject to the heat cycle of high/low temperature and improve the durability.

5th Embodiment

FIG. 12 is a plan view of when a holder is made according to a fifth embodiment and FIG. 13 is a plan view showing that an unwanted portion in FIG. 12 is removed. This fifth embodiment has the same structure as the fourth embodiment except a lead frame for forming the terminal 6 and the metal member 12.

As shown in FIGS. 12–13, in this fifth embodiment, the metal member 12 mounted on the housing portion 3 of the holder 1, the terminal 6 and a portion to be removed 14 are made of the same material as a lead frame 13 integrally formed. For example, copper, copper alloy or iron nickel alloy is used. The lead frame 13 is integrally formed with the rectification structure portion 2 and the terminal securing portion 7 by means of insert molding. Then, as shown in FIG. 13, a removal portion 14 of the unwanted region of the lead frame 13 shown by slant lines is removed by punching and the like to form the metal member 12 and the terminal 6, thereby making the holder 1.

By making the holder 1 with this process, it is possible to easily arrange the metal member 12 and the terminal 6 and suitable for mass production since hoop molding is possible.

6th Embodiment

FIG. 14 is a plan view of a holder according to a 6th embodiment and FIG. 15 is a cross sectional view taken along line D—D of FIG. 14. This 6th embodiment has the same structure as the 4th embodiment except top end portions of the terminals 6.

As shown in FIGS. 14–15, in this 6th embodiment, the terminal 6 is bent, at the top portion 15 of its one end which is electrically connected to the electrode 5 of the sensing element 4, in the bottom surface direction of the holder 1 and embedded therein. The tip 15a of the top portion 15 is arranged to extend to the reverse side of the terminal securing portion 7.

Thus, even when wire connection is made between the sensing element 4 and the terminal 6 by for example wire bonding of aluminum, it is possible to improve the adhesion of the terminal 6 to the terminal securing portion 7. With this structure, since an energy amount, of the ultrasonic energy utilized for bonding, dispersing to the terminals is reduced, it is possible to efficiently transfer the ultrasonic energy to the wire 8, and stable wire bonding can be effected.

7th Embodiment

FIG. 16 is a plan view of en essential component employed in FIG. 3 showing a holder according to a seventh embodiment. This seventh embodiment has the same structure as the sixth embodiment except number of the terminal 6, a top portion 15 and the electrode 5 on the sensing element 4.

As shown in FIG. 16, according to this seventh embodiment, each terminal 6 is projectingly arranged so that the top portion 15 of its one end which is electrically connected to the sensing element 4 is gradually lengthened from the central portion to the peripheral portion to surround the electrode 5 of the sensing element 4.

For example, as shown in FIG. 17, when the projecting position of the top portion 15 of one end of the terminal 6 in the direction of the sensing element 4 has the same length and is extended to the electrode 5, and when the wire bonding is made by the wire 8 between the sensing element 4 and the terminal 6, each wire 8 is closely arranged.

According to the seventh embodiment, each wire can be arranged so that it does not pass on the other terminal 6 adjacent to the terminal 6 to be connected. Thus, since each wire 8 can be separated, it is possible to prevent short circuit of the wire 8 and improve the reliability of this connecting portion.

Accordingly, the number of the terminal 6 can be increased (8 terminals are shown here). Thus, it is possible to cope with a multifunctional type of sensing element provided with another resistor in addition to a set of the exothermic resistor and the thermometric resistor provided on the sensing element 4. It is also possible to narrow the width of the terminal 6 or a pitch (clearance) between each terminal 6 and as a result, the flow rate sensor can be smaller.

8th Embodiment

FIG. 18 is a plan view corresponding to the plan view of the essential component utilized in FIG. 3 showing the holder according to a eighth embodiment and FIG. 19 is a plan view corresponding to the enlarged plan view showing E-portion of FIG. 18. The eighth embodiment has the same structure as the seventh embodiment except the arranging shape of the electrode 5 on the sensing element 4.

As shown in FIGS. 18–19, according to the eighth embodiment, the electrode 5 of the sensing element 4 is disposed in an arch shape to allow the central portion to project further than the peripheral portion, on one side of the terminal 6 to which the electrode 5 is electrically connected.

For example, as shown in FIG. 20, the position of the electrode 5 in the terminal 6 direction is linearly arranged. When wire bonding is made by wire 8 between the electrode 5 and the terminal 6 and if there are a large number of terminals 6, there is some possibility that a tail 16 of the wire 8 produced at the joint of the electrode 5 interferes in the adjacent electrode 5 other than the electrode 5 to be connected since the electrode 5 is very minute.

However, according to this eighth embodiment, since the position of the electrode 5 in the terminal 6 direction is arranged to allow the central portion to project further in a convex manner from the peripheral portion, the tail 16 does not interfere in the other electrodes 5 adjacent thereto. Thus, it is possible to prevent the short circuit of the wire 8 and improve the reliability of the joint.

As described above, the number of the terminal 6 may be increased, while it is possible to narrow the width of the terminal 6 or the pitch (clearance) between each terminal.

9th Embodiment

FIG. 21 is a cross-sectional view taken along line A—A of FIG. 1 showing a holder 1 according to a ninth embodiment and FIG. 22 is a plan view of the holder before it is bent. FIG. 23(a), (b) and (c) are top view, side view and plan view of the terminal, respectively, the other end of which is bent. FIG. 24(a) is a side view showing the condition that the terminal of the holder is extended to the control circuit substrate and FIG. 24(b) is a plan view as viewed from the top (F-direction) of the control circuit substrate, respectively. The ninth embodiment has the same structure as the fifth embodiment except a lead frame 13 for forming the terminal 6.

As shown in FIG. 21, according to this ninth embodiment, to improve the sensitivity of sensing element 4 relative to intake airflow or flow velocity into the main conduit 20, the holder 1 is slantly disposed to make an angle of β° relative to the flow direction of a fluid. As shown in FIG. 22, the other end of the terminal 6 extending to the control circuit substrate 22 side of the holder 1 is disposed to make an angle of β° relative to a central axis, each length of which is changed to have: (L1>L2>L3>L4).

Figure 23B:
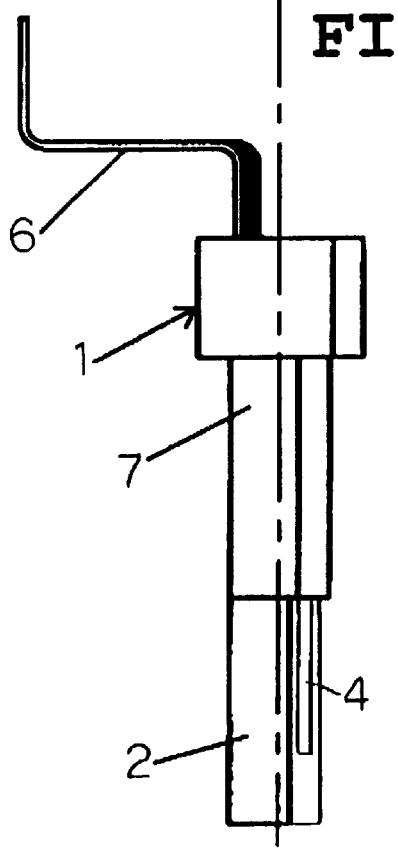
Figure 23C:
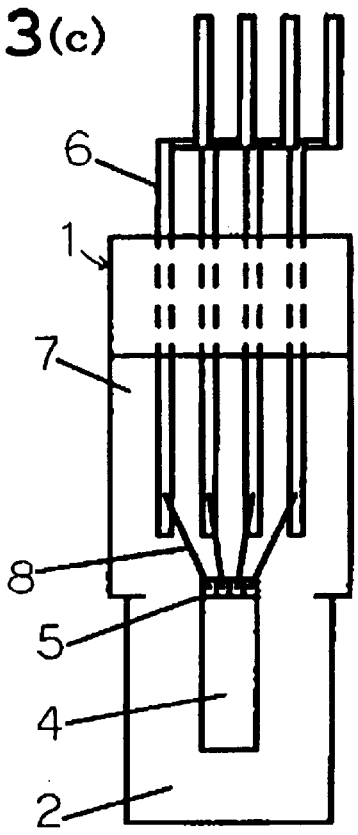
Figure 24:
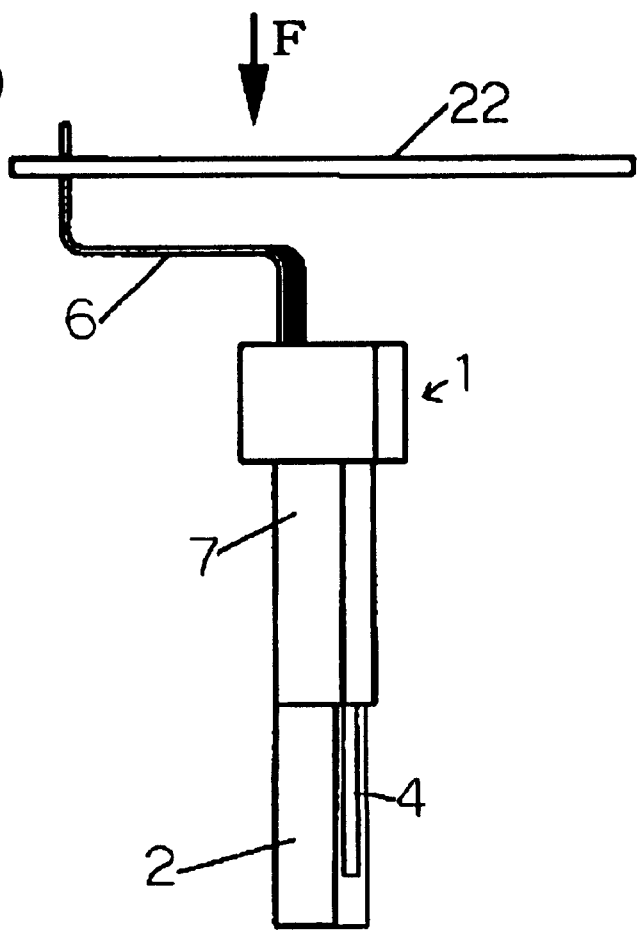
Figure 24:
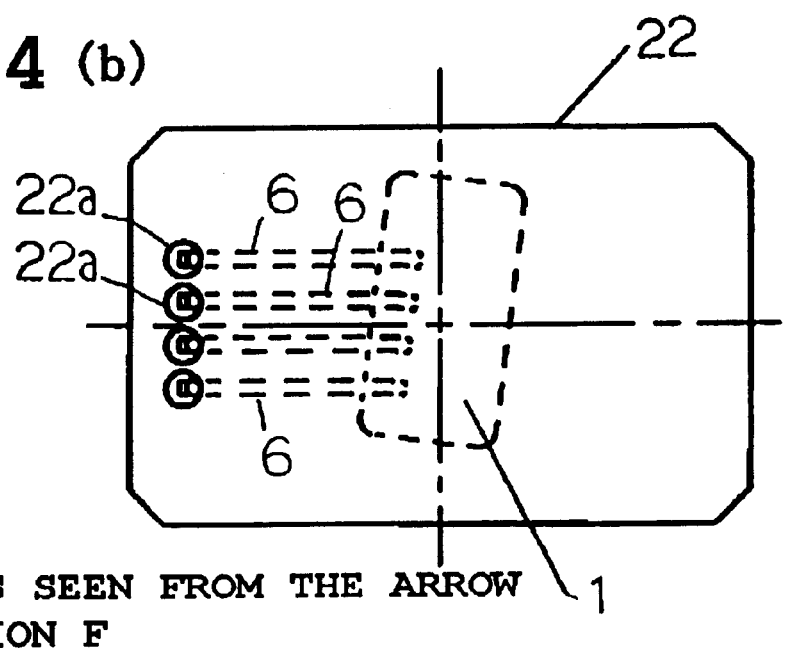

The lead frame 13 is designed to have such length, shape and removal portion 14 and after the removal portion 14 is removed, the other end of each terminal 6 is bent twice as shown in FIGS. 23–24. Namely, the other end of each terminal 6 projecting from the holder 1 is bent on the side of a connecting terminal inserting opening 22a to be parallel to the control circuit substrate 22. Further, this bent top is bent in parallel to the connecting terminal inserting openings 22a which are linearly formed along the outer edge of the control circuit substrate 22.

If the other end of the terminal 6 extending to the control circuit substrate 22 is formed straight without bending, it is arranged to make an angle of β° on the control circuit substrate 22 when the holder 1 is slantly inserted relative to the flowing direction. In this case, it is necessary to arrange the connecting terminal inserting openings 22a to make an angle of β° relative to the edge portion. As a result, an effective area of the control circuit substrate 22 is reduced compared with when the holder 1 is inserted substantially in parallel in the flowing direction. Therefore, there is some possibility that it imposes restrictions on a pattern design such as an output line of the detecting signal and a gland line or a layout of electronic parts and the control circuit substrate 22 becomes larger.

According to the ninth embodiment, even when the holder 1 is slantly inserted in the flowing direction, the connecting terminal inserting openings 22a are formed along the edge portion of the control circuit substrate 22, to which the other end of the terminal 6 is connected after bending.

It is therefore possible to control the size of the flow rate sensor not to make it larger without reducing the effective area on the control circuit substrate 22.

Although the holder 1 is slantly provided, it is also possible to slantly dispose both the holder 1 and the control circuit substrate 22. In this case, it is necessary to change the position of the projection 20a projecting from the outer periphery of the main conduit 20 to secure the control circuit substrate 22 as shown in FIG. 2. According to the ninth embodiment, it is not necessary to change the position of the projection 20a, but by bending the other end of the terminal 6, the same one can be utilized.

Also, since the holder 1 and the control circuit substrate 22 are vertically situated, the other end of the terminal 6 is bent twice. However, if the holder 1 and the control circuit substrate 22 are situated in parallel, it is only necessary to bend the other end of the terminal 6 once.

10th Embodiment

FIG. 25 is a cross sectional view of an essential component employed in FIG. 1 showing a holder according to a tenth embodiment. The tenth embodiment has the same structure as the fourth embodiment except the metal member 12.

As shown in FIG. 25, according to the tenth embodiment, a part of the metal member 12 provided on the bottom surface of the housing portion 3 is electrically connected to a power ground pattern formed on the control circuit substrate 22 by a connecting terminal 12a which is projecting from the part. Further, the metal member 12 is arranged to cover the reverse side of the sensing element 4 and forms an electromagnetic shielding structure for blocking electromagnetic noise radiated on the sensing element 4. Also, the connecting terminal 12a is made as a part of the lead frame 13 for forming the terminal 6, to be parallel to the terminal 6.

Thus, even in such an environment as to receive the electromagnetic noise from outside, it is possible to release the electromagnetic noise to the power ground at the periphery of the sensing element 4. Therefore, it is possible to keep the detecting accuracy of the intake airflow or flow velocity from deteriorating when the electromagnetic noise superposes on the detecting signal. Also, the metal member 12 is grounded on the power ground, but it may be grounded on the electromagnetic shielding member.

11th Embodiment

FIG. 26 is a perspective view of an essential component showing the condition that the sensing element 4 is disposed on the holder according to a eleventh embodiment and FIG. 27 is a cross sectional view taken along line G—G of FIG.

26. FIG. 28 is a perspective view of an essential component utilized in the holder. This eleventh embodiment has the same structure as the fourth embodiment except an adhesive agent storage portion 17.

As shown in FIGS. 27–28, according to the eleventh embodiment, the metal member 12 is disposed on the bottom surface of the housing portion 3 and has a die bonding portion 11 on the upper surface thereof. A recessed adhesive agent storage portion 17 is provided near the metal member 12.

Thus, when the sensing element 4 is disposed on the housing portion 3 by the adhesive agent, even if the excessively applied adhesive agent is forced out between the sensing element 4 and the die bonding portion 11, this adhesive agent is stored in the adhesive agent storing portion 17. Accordingly, since it is possible to keep the unnecessary adhesive agent from being forced out on the surface of the sensing element 4 and on the electrode 5, it is possible to secure the reliability of the sensing element 4 and provide stable wire bonding even when the bonding is effected by the wire 8 between the sensing element 4 and the terminal 6.

The adhesive agent storing portion 17 is formed along the periphery of the securing portion 12 by the protrusion 19a protruding upwardly from the bottom surface of the housing portion 3. The adhesive agent storing portion 17 is provided near the metal member 12, but it may be effective even when the metal member 12 is not provided and the adhesive agent is applied on the bottom surface of the housing portion 3.

Furthermore, the adhesive agent storing portion 17 may be provided between the die bonding portion 11 and a diaphragm 10 which is thinner than the sensing element 4. With this structure, it is possible to prevent the breakage of the diaphragm 10 even if the adhesive agent flows into the revere side of the diaphragm 10.

12th Embodiment

FIG. 29 is a perspective view of an essential component utilized in the holder according to a twelfth embodiment and FIG. 30 is a cross sectional view taken along line H—H of FIG. 29. Since a perspective view of an essential component in a condition that the sensing element is mounted on the holder is the same as FIG. 26, it is omitted. This twelfth embodiment has the same structure as FIG. 4 except the adhesive agent storing portion 17a.

As shown in FIGS. 29–30, according to this twelfth embodiment, there are provided a groove and the adhesive agent storage portion 17a, on the upper surface of the metal member 12, to cover the periphery of the die bonding portion 11 which is applied to secure and bond the sensing element 4 thereon. The adhesive agent storing portion 17a is formed along the periphery of the die bonding portion 11 by the protrusion 19b protruding upwardly from the bottom surface of the housing portion 3. The protrusion 19b is formed in the metal member 12.

Thus, it is possible to keep the adhesive agent from being forced out on the electrode 5 on the sensing element 4 and provide stable wire bonding when the wire bonding is effected by the wire 8 between the sensing element 4 and the terminal 6.

13th Embodiment

FIG. 31 is a perspective view of an essential component employed in the holder according to a thirteenth embodiment. FIG. 32 is a perspective view of an essential component in a condition that the sensing element is mounted on the holder and FIG. 33 is a cross sectional view taken along line J—J of FIG. 32. This thirteenth embodiment has the same structure as the fourth embodiment except an extension portion 18.

As shown in FIGS. 31–32, according to the thirteenth embodiment, an extension portion 18 is provided on the side of the housing 3 and on the periphery of the die bonding portion 11 for securing the sensing element 4. The extension portion 18 is formed to have a step portion that is expanded outward than the side of the sensing element 4 and formed in a recess shape.

With this structure, it is possible to get the same effect as the twelfth embodiment. Further, as shown in FIG. 33, both ends of the sensing element 4 can be picked up with tweezers P and the like from the extension portion 18 and inserted into the housing portion 3. Since the top of the tweezers does not interfere in the holder 1, it is possible to dispose the sensing element 4 in position surely and accurately. Specifically, if the extension portion 18 is not provided, it is necessary to allow the sensing element 4 to touch the tip of the housing portion 3 for temporary positioning before the sensing element 4 is put in position by its own weight. In this case, positional deviation of the sensing element 4 may be caused and it is necessary to correct the deviation.

However, according to the thirteenth embodiment, provision of the extension portion 18 assures stable mounting of the sensing element 4 into the positioning portion within the housing portion 3 and insertion can be improved.

As described above, according to the invention, there is provided a holder for disposing a plate-like sensing element in a predetermined flow passage, the holder being provided with a housing portion for disposing the sensing element in a predetermined position and having a rectification structure portion for rectifying the flow of an intake fluid and a connecting terminal securing portion with a connecting terminal embedded therein for fetching a signal of the sensing element, wherein the rectification structure portion and the connecting terminal securing portion are integrally formed by insulating material. With this structure, it is possible to provide stable wire bonding for electrically connecting an electrode of the sensing element to the connecting terminal.

According to the invention, the connecting terminal is embedded in the connecting terminal securing portion of the holder. The connecting terminal is disposed in a predetermined position of the holder and deviation of relative position of the electrode of the sensing element and the connecting terminal becomes small.

According to the invention, the rectification structure portion is formed to have a round fin-plate shape or a wing shape at least on the upstream side. It is therefore possible to form the rectification structure portion by resin and easily design the shape of the rectification structure portion from a fluid engineering point of view. The detecting accuracy of the flow rate or flow velocity can also be improved.

According to the invention, there is provided, on the bottom surface of the housing portion, a positioning portion for controlling the height of disposition in the thickness direction of the sensing element so that the upper surface of the sensing element has the same height as the surface of the holder. Since the height of disposition of the sensing element is controlled, it is possible to secure the detecting accuracy of the flow rate or flow velocity.

According to the invention, the positioning portion is provided in at least three places. Since they can control the inclination of a diaphragm relative to the flowing direction, it is possible to secure the detecting accuracy of the flow rate or flow velocity.

According to the invention, there is provided a metal member on the bottom surface of the housing portion and an adhesive agent is applied on the metal member to fixedly bond the sensing element thereon. It is therefore possible to provide stable bonding and improve the reliability and durability.

According to the invention, the metal member is formed to have a lead frame shape together with the connecting terminal made of the same material as the metal member and it is then integrally formed with the rectification structure portion and the connecting terminal securing portion so as to form the holder by removing an unwanted part therefrom. It is therefore possible to form the holder by a process suitable for productivity.

According to the invention, the connecting terminal has one end which is electrically connected to the electrode of the sensing element, the top of which is bent in the bottom surface direction of the holder to be embedded therein. It is therefore possible to provide stable wire bonding and improve the reliability and durability.

According to the invention, the connecting terminal has one end which is electrically connected to the electrode of the sensing element, the top of which is projectingly disposed to be gradually longer from the central portion to the peripheral portion to surround the electrode of the sensing element. It is therefore possible to improve the reliability of the wire bonding portion and make the flow rate sensor smaller and multifunctional.

According to the invention, the electrode of the sensing element is disposed in an arch shape to allow the central part thereof to project longer than the peripheral part relative to one end of the connecting terminal which is electrically connected to the electrode. It is therefore possible to improve the reliability of the wire bonding portion and make the flow rate sensor smaller and multifunctional.

According to the invention, the holder is slantly disposed in a flow passage relative to the flow direction of a fluid, wherein the other end of the connecting terminal opposite to one end thereof that is connected to the electrode of the sensing element is extended to a control circuit substrate for controlling the sensing element, bent to be substantially parallel to a connecting terminal inserting opening that is linearly formed at the outer edge of the control circuit substrate, and then inserted into the connecting terminal inserting opening for connection. It is therefore possible to make the flow rate sensor smaller.

According to the invention, the metal member is disposed on the bottom surface of the housing portion to cover a part of or all over the reverse side of the sensing element and a part of the metal member is connected to power ground or an electromagnetic shielding member to form an electromagnetic shielding structure for insulating the electromagnetic noise radiated on the sensing element. It is therefore possible to keep the detecting accuracy of the flow rate or flow velocity due to the electromagnetic noise from deteriorating.

According to the invention, there is provided a recessed adhesive agent storage portion for storing unwanted adhesive agent in the housing portion of the holder near a portion where an adhesive agent is applied to fixedly bond the sensing element. It is therefore possible to prevent the damage or breakage of the sensing element or the electrode and improve the reliability of the wire-bonding portion.

According to the invention, the adhesive agent storage portion is provided between a portion where the adhesive agent is applied and a diaphragm portion formed on the upper surface of the sensing element. It is therefore possible to prevent the damage or breakage of the sensing element and the electrode and improve the reliability of the wire-bonding portion.

According to the invention, the adhesive agent storage portion is provided as a groove to cover the outer periphery of the portion where the adhesive agent is applied. It is therefore possible to prevent the breakage or damage of the sensing element and the electrode and improve the reliability of the wire-bonding portion.

According to the invention, an extension portion having a recessed step extended outward from the side of the sensing element is provided on the side of the housing portion to surround a portion where the adhesive agent is applied for fixedly bonding the sensing element. It is therefore possible to prevent the breakage or damage of the sensing element and the electrode, improve the reliability of wire-bonding portion and inserting property of the sensing element.

What is claimed is:

1. A thermo-sensitive type flow rate sensor in which a holder has connection terminals and a sensing element and said connection terminals and electrodes of said sensing element are connected by wire bonding, said connection terminals and a housing portion are provided mutually separated on one surface of said holder, said housing portion being formed as a recess in one surface of said holder, a protruded securing portion and protruded positioning portions are provided within said recess at ends thereof, said sensing element being oriented within said recess such that an upper surface of the same, having said electrodes, faces outwardly of said housing portion, and a lower surface of said sensing element, without electrodes, is adhered to an upper surface of a securing portion by an adhesive agent, whereby said lower surface contacts upper surfaces of said positioning portions, and a thermal sensitive region of said sensing element does not contact either of said securing portion and said positioning portions, and a gap is formed between said sensing element and a bottom surface of said housing recess.

2. The thermo-sensitive type flow rate sensor according to claim 1, wherein the surface of the connecting terminals are exposed.

3. The thermo-sensitive type flow rate sensor according to claim 1, wherein the holder includes a rectification structure portion formed to have a round fin-plate shape or a wing shape at least on an upstream side.

4. The thermo-sensitive type flow rate sensor according to claim 3, wherein said upper surface of said sensing element is flush with said rectification structure portion of said holder.

5. The thermo-sensitive type flow rate sensor according to claim 1, wherein the positioning portions are provided in at least three locations.

6. The thermo-sensitive sensor according to claim 1, wherein a metal member is provided on said bottom surface of the recess and an adhesive agent is applied to the metal member to fixedly bond the sensing element thereon.

7. The thermo-sensitive type flow rate sensor according to claim 6, wherein the metal member is formed to have a lead frame shape together with the connection terminals, and the metal member is integrally formed with a rectification structure portion and a terminal securing portion so as to form the holder by removing an unnecessary part of the lead frame.

8. The thermo-sensitive type flow rate sensor according to claim 1, wherein each connecting terminal has one end which is electrically connected to the electrode of the sensing element, and a top of the one end is bent in a direction of the recess to be embedded in said holder.

9. The thermo-sensitive type flow rate sensor according to claim 1, wherein each connecting terminal has one end which is electrically connected to an electrode of the sensing element, said connecting terminals being graduated in length from a central terminal to peripheral terminals so as to partially surround the electrode of the sensing element.

10. The thermo-sensitive type flow rate sensor according to claim 1, wherein the electrodes of the sensing element are disposed in an arch shape to allow the central ones thereof to project further in a direction of said connection terminals.

11. The thermo-sensitive type flow rate sensor according to claim 1, wherein the holder is slantingly disposed in a flow passage relative to a flow direction of a fluid, wherein a second end of the contacting terminals is extended to a control circuit substrate for controlling the sensing element, and is bent to be substantially parallel to a connecting terminal inserting opening that is linearly formed at an outer edge of the control circuit substrate.

12. The thermo-sensitive type flow rate sensor according to claim 6, wherein the metal member covers at least a part of a reverse side of the sensing element, and at least a part of the metal member is connected to power ground or an electromagnetic shielding member to form an electromagnetic shielding structure for insulating against electromagnetic noise radiated on the sensing element.

13. The thermo-sensitive type flow rate sensor according to claim 1, wherein a protrusion forming a channel within said recess is located between said securing portion and said positioning portions in order to store unwanted adhesive agent overflowed from between said sensing element and said securing portion.

14. The thermo-sensitive type flow rate sensor according to claim 13, wherein the adhesive agent storage portion is provided between a portion where the adhesive agent is applied and a diaphragm portion formed on an upper surface of the sensing element.

15. The thermo-sensitive type flow rate sensor according to claim 13, wherein the adhesive agent storage portion is provided as a channel surrounding a periphery of the portion where the adhesive agent is applied.

16. The thermo-sensitive type flow rate sensor according to claim 13, wherein an extension portion of said recess extends laterally of the sensing element to surround the portion where the adhesive agent is applied for fixedly bonding the sensing element.

* * * * *